US012638999B2

(12) United States Patent　　　　(10) Patent No.:　US 12,638,999 B2
Sato et al.　　　　　　　　　　　　(45) Date of Patent:　　May 26, 2026

(54) APPARATUS, METHOD, AND SYSTEM FOR MANAGING REPLICATION BASED ON REPLICATION DELAY TIME

(71) Applicant: Hitachi Vantara, Ltd., Yokohama (JP)

(72) Inventors: Kenta Sato, Tokyo (JP); Akiyoshi Tsuchiya, Tokyo (JP); Akira Deguchi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/828,045

(22) Filed: Sep. 9, 2024

(65) Prior Publication Data

US 2025/0298531 A1　　Sep. 25, 2025

(30) Foreign Application Priority Data

Mar. 22, 2024　(JP) ................................. 2024-047156

(51) Int. Cl.
G06F 3/06　　　　(2006.01)
(52) U.S. Cl.
CPC ............ G06F 3/065 (2013.01); G06F 3/0604 (2013.01); G06F 3/067 (2013.01)
(58) Field of Classification Search
CPC ......... G06F 3/065; G06F 3/0604; G06F 3/067
USPC ........................................................ 711/161
See application file for complete search history.

(56) References Cited

U.S. PATENT DOCUMENTS

| | | | |
|---|---|---|---|
| 2004/0268067 A1 | 12/2004 | Yamagami | |
| 2014/0089265 A1* | 3/2014 | Talagala .................. | G06F 16/22 |
| | | | 707/674 |
| 2014/0250079 A1* | 9/2014 | Gardner ............. | G06F 11/1453 |
| | | | 707/646 |
| 2017/0013057 A1* | 1/2017 | Shani ...................... | G06F 3/065 |
| 2022/0405237 A1 | 12/2022 | Matsushita | |

FOREIGN PATENT DOCUMENTS

| | | |
|---|---|---|
| JP | 2005-018738 A | 1/2005 |
| JP | 2023-001471 A | 1/2023 |

* cited by examiner

*Primary Examiner* — Than Nguyen
(74) *Attorney, Agent, or Firm* — MATTINGLY & MALUR, PC

(57)　　　　　ABSTRACT

To provide a management apparatus, a management method, and a storage system in which even in an environment where a connection speed and an amount of data written from a host are uncertain, remote copy can be stably operated. A management apparatus includes a processor and manages a plurality of storage apparatuses communicating with one another via a network and having a respective volume. In the management apparatus, a remote copy transferred from a replication source volume of a plurality of volumes to a replication destination volume via the network and duplicated is set for a combination of a plurality of replication source volumes and replication destination volumes. The management apparatus monitors a replication delay time, which a time required for duplicating a remote copy, and exercises control to limit an amount of transferred data of other remote copies based on the replication delay time.

11 Claims, 17 Drawing Sheets

FIG. 4

STORAGE APPARATUS INFORMATION
0311

| APPARATUS ID 0400 | APPARATUS NAME 0401 | STORAGE CLASSIFICATION 0402 | MACHINE TYPE 0403 | CONNECTION INFORMATION 0404 | ... |
|---|---|---|---|---|---|
| 0 | Primary – Str | BLOCK | Block – Model – X | IP=1.1.1.1<br>AccessToken = abc...<br>... | ... |
| 1 | Secondary – Str – A | BLOCK | Block – Model – Y | IP=1.1.1.2<br>AccessToken = def...<br>... | ... |
| 2 | Secondary – Str – B | OBJECT | Object – Model – Z | IP=1.1.1.3<br>AccessToken = ghi...<br>... | ... |
| ... | ... | ... | ... | ... | ... |

FIG. 5

REMOTE COPY CONFIGURATION INFORMATION
0312

| REPLICATION ID 0500 | REPLICATION NAME 0501 | REPLICATION MODE 0502 | REPLICATION SOURCE INFORMATION 0503 | REPLICATION DESTINATION INFORMATION 0504 | REPLICATION GROUP ID 0505 |
|---|---|---|---|---|---|
| 0 | APP – A | JOURNAL | APPARATUS ID = 0 VOL ID = 100 JNL ID = 10 | APPARATUS ID = 1 VOL ID = 200 JNL ID = 20 | 0 |
| 1 | APP – B | JOURNAL | APPARATUS ID = 0 VOL ID = 110 JNL ID = 20 | APPARATUS ID = 1 VOL ID = 210 JNL ID = 30 | 0 |
| 2 | APP – C | SNAPSHOT | APPARATUS ID = 0 VOL ID = 120 | APPARATUS ID = 2 | 1 |
| 3 | APP – D | SNAPSHOT | APPARATUS ID = 0 VOL ID = 130 | APPARATUS ID = 2 | 1 |
| ⋮ | ⋮ | ⋮ | ⋮ | ⋮ | ⋮ |

FIG. 6

THROTTLING SETTING INFORMATION
<u>0313</u>

| REPLICATION ID | HOST IO LIMITATION | INTER-APPARATUS TRANSFER SPEED LIMITATION | INITIAL COPY OPERATION LIMITATION | ... |
|---|---|---|---|---|
| 0 | UNLIMITED | UNLIMITED | UNLIMITED | ... |
| 1 | 7.5k IOPS | UNLIMITED | UNLIMITED | ... |
| 2 | UNLIMITED | UNLIMITED | UNLIMITED | ... |
| 3 | UNLIMITED | 20 MB/s | UNLIMITED | ... |
| 4 | UNLIMITED | UNLIMITED | STOPPED | ... |
| ... | ... | ... | ... | ... |

SERVICE LEVEL OBJECTIVE INFORMATION
<u>0314</u>

| REPLICATION ID | LOWER-LIMIT IO AMOUNT | RPO | ... |
|---|---|---|---|
| 0 | 10k IOPS | 30 sec | ... |
| 1 | 5k IOPS | 30 sec | ... |
| 2 | 5k IOPS | 5 min | ... |
| 3 | 3k IOPS | 10 min | ... |
| ... | ... | ... | ... |

FIG. 8

REMOTE COPY PERFORMANCE INFORMATION
0315

| | 0800 | 0801 | 0802 | 0803 | 0804 | |
| REPLICATION ID | OPERATION STATUS | HOST IO AMOUNT | REPLICATION DELAY | JOURNAL USAGE RATIO | INTER-APPARATUS TRANSFER SPEED | |
|---|---|---|---|---|---|---|
| 0 | ORDINARY | 12k IOPS | 31 sec | 20% | 63 MB/s | ⋮ |
| 1 | ORDINARY | 7.5k IOPS | 29 sec | 30% | 30 MB/s | ⋮ |
| 2 | ORDINARY | 10k IOPS | 4 min | N/A | 41 MB/s | ⋮ |
| 3 | ORDINARY | 5k IOPS | 9 min | N/A | 20 MB/s | ⋮ |
| 4 | INITIAL COPY | 3k IOPS | N/A | N/A | 100 MB/s | ⋮ |
| ⋮ | ⋮ | ⋮ | ⋮ | ⋮ | ⋮ | ⋮ |

SERVICE LEVEL OBJECTIVE EXCESS AND
SHORTAGE RATIO INFORMATION
<u>0316</u>

| REPLICATION ID | LOWER-LIMIT IO AMOUNT EXCESS AND SHORTAGE RATIO | RPO EXCESS AND SHORTAGE RATIO | MAXIMUM EXCESS AND SHORTAGE RATIO | MINIMUM EXCESS AND SHORTAGE RATIO | ... |
|---|---|---|---|---|---|
| 0500 | 0900 | 0901 | 0902 | 0903 | |
| 0 | 120% | 97% | 120% | 97% | ... |
| 1 | 150% | 103% | 150% | 103% | ... |
| 2 | 200% | 125% | 200% | 125% | ... |
| 3 | 166% | 111% | 166% | 111% | ... |
| 4 | ∞ | ∞ | ∞ | ∞ | ... |
| ... | ... | ... | ... | ... | ... |

FIG. 10

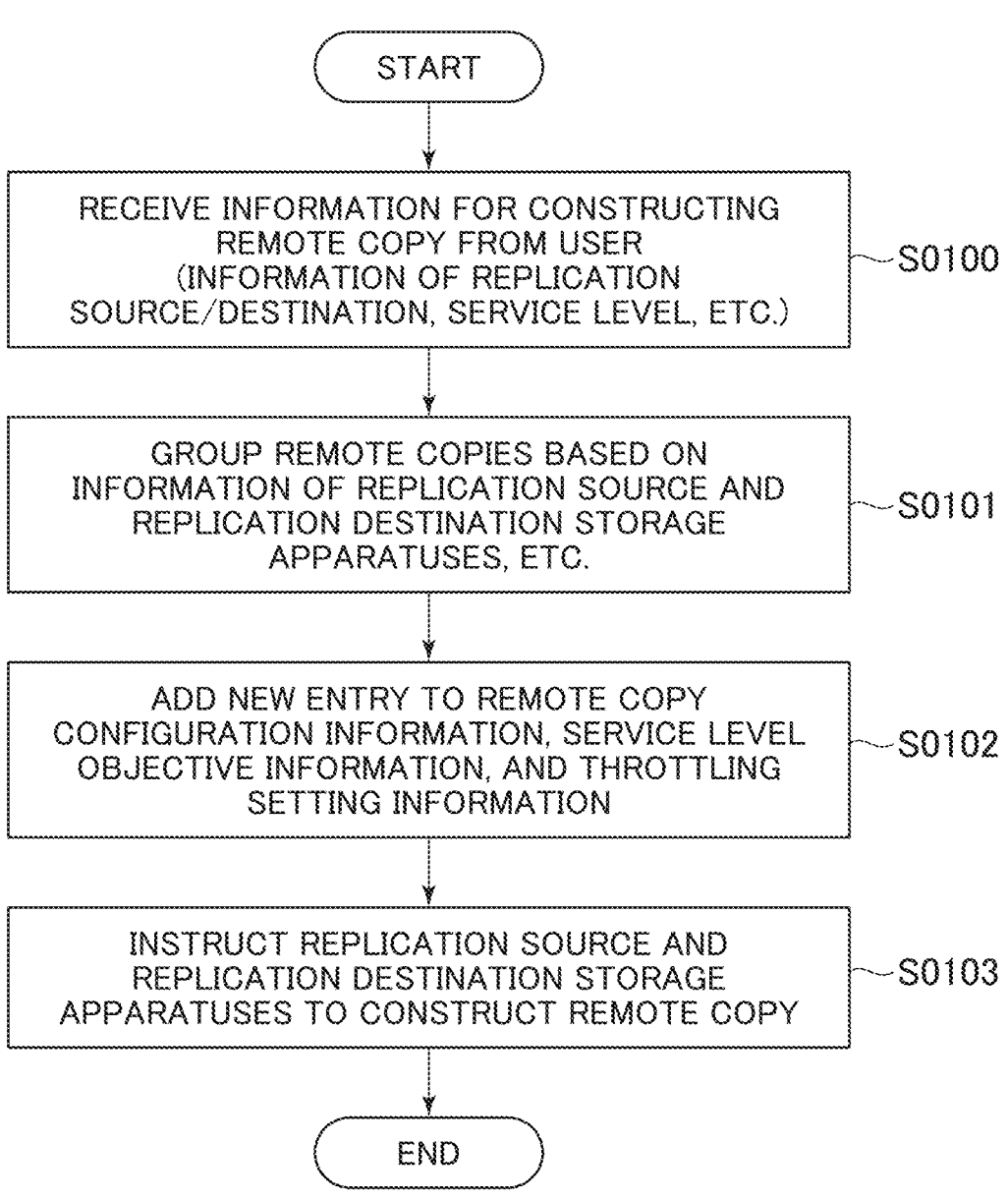

START

RECEIVE INFORMATION FOR CONSTRUCTING
REMOTE COPY FROM USER
(INFORMATION OF REPLICATION
SOURCE/DESTINATION, SERVICE LEVEL, ETC.) — S0100

GROUP REMOTE COPIES BASED ON
INFORMATION OF REPLICATION SOURCE AND
REPLICATION DESTINATION STORAGE
APPARATUSES, ETC. — S0101

ADD NEW ENTRY TO REMOTE COPY
CONFIGURATION INFORMATION, SERVICE LEVEL
OBJECTIVE INFORMATION, AND THROTTLING
SETTING INFORMATION — S0102

INSTRUCT REPLICATION SOURCE AND
REPLICATION DESTINATION STORAGE
APPARATUSES TO CONSTRUCT REMOTE COPY — S0103

END

FIG. 11

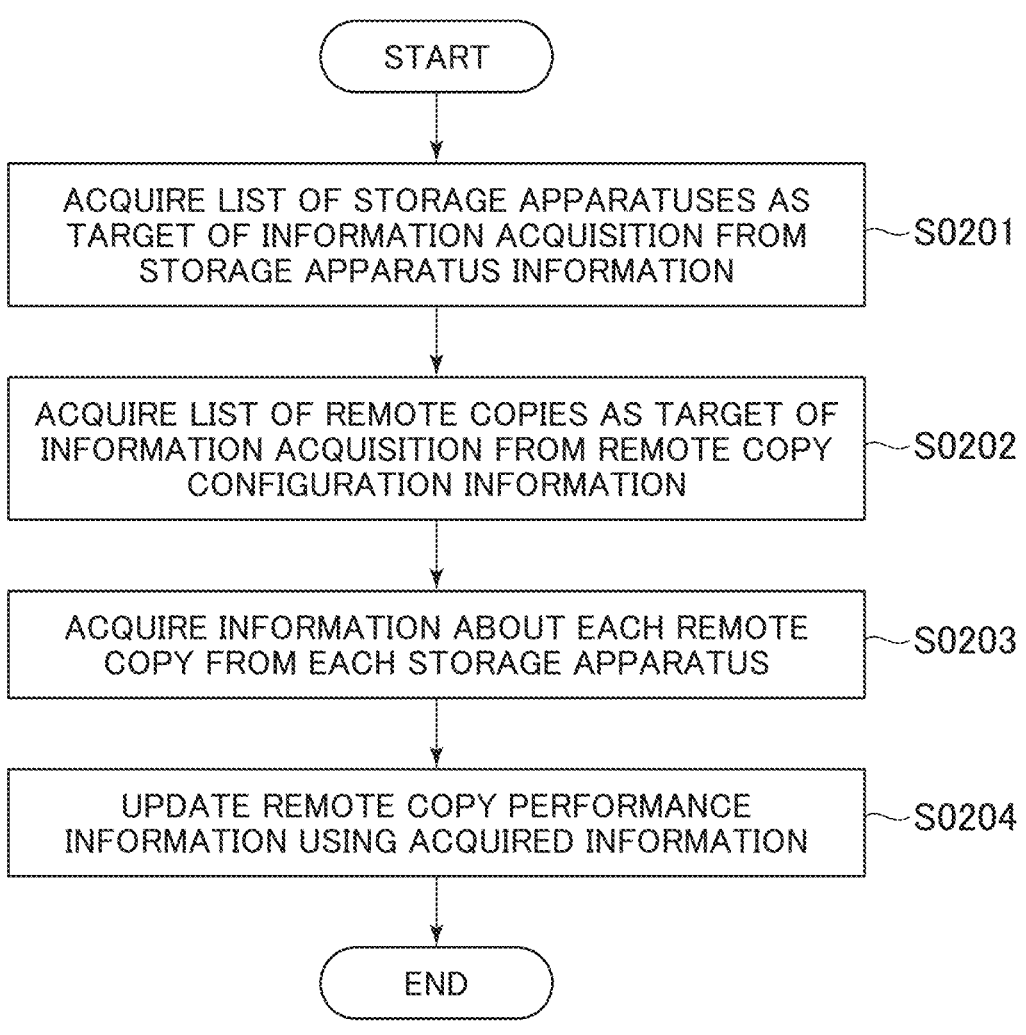

START

ACQUIRE LIST OF STORAGE APPARATUSES AS TARGET OF INFORMATION ACQUISITION FROM STORAGE APPARATUS INFORMATION —S0201

ACQUIRE LIST OF REMOTE COPIES AS TARGET OF INFORMATION ACQUISITION FROM REMOTE COPY CONFIGURATION INFORMATION —S0202

ACQUIRE INFORMATION ABOUT EACH REMOTE COPY FROM EACH STORAGE APPARATUS —S0203

UPDATE REMOTE COPY PERFORMANCE INFORMATION USING ACQUIRED INFORMATION —S0204

END

APPARATUS, METHOD, AND SYSTEM FOR MANAGING REPLICATION BASED ON REPLICATION DELAY TIME

CROSS-REFERENCE TO RELATED APPLICATION

The present application claims priority from Japanese application JP2024-047156, filed on Mar. 22, 2024, the content of which is hereby incorporated by reference into this application.

BACKGROUND

The present invention relates to a management apparatus, a management method, and a storage system. The present invention relates in particular to a management apparatus and the like capable of appropriately managing a replication delay time when a remote copy is made.

A storage system required to be highly reliable often prepares replications of data at a remote location in case of a failure in a storage apparatus and a natural disaster.

Some storage apparatuses have a function of duplicating data to a remote location (also referred to as remote copy function or remote replication function). In this case, a replication system generally designated as journal-based system and a replication system generally designated as snapshot-based system are present.

These replication systems respectively have an advantage and a disadvantage and selectively used according to requirements. The replication systems involve a common problem: for an amount of data written from a host, a sufficient speed of a network connection must be kept transferring the data to a remote location. If a network connection speed becomes insufficient, an amount of data that has not been duplicated to a remote storage apparatus is increased and thus an amount of data lost in an occurrence of failure is increased and RPO (Recovery Point Objective) cannot be kept. In case of journal-based system, a journal area becomes full and as a result, remote copy operation cannot be maintained. In this case, a situation in which operation of remote copy is not possible arises.

Japanese Unexamined Patent Application Publication No. 2005-18738 discloses that a storage system maintains a plurality of journal entries and a journal of at least one snapshot of one or more data volumes. In this storage system, a specific sequence-number is assigned to each journal and each snapshot in chronological order and as a result, a journal to be applied to a snapshot can be easily found.

Japanese Unexamined Patent Application Publication No. 2023-1471 discloses a storage system connected to another storage system via a network and the storage system includes a memory, a processor that executes a program stored in the memory, and a storage device. Through execution of a program, the processor provides a virtual volume, generates a plurality of snapshots with different timing with respect to the virtual volume, causes the storage device to hold a base snapshot, which is a snapshot as a basis among the snapshots, and sends differential data that indicates a difference between a snapshot generated after the base snapshot and a snapshot generated immediately before the snapshot to another storage system and causes the storage system to hold the differential data.

SUMMARY

Conventionally, a remote copy used to be configured between storage apparatuses installed on premise but a hybrid cloud configuration has been recently increased; in the hybrid cloud configuration, a storage apparatus as a replication destination is prepared in a public cloud for operation cost reduction. In an on-premises remote copy configuration, a dedicated connection high in stability is generally used as a network connection between storage apparatuses; meanwhile, in a hybrid cloud configuration for operation cost reduction, an internet connection is often used and connection speed is unstable as compared with conventional cases. In recent software development with importance placed on agility, it is difficult to correctly estimate an amount of data written into a storage apparatus by an application (host) in advance. Because of such environmental changes, in recent years, it has become difficult to stably operate a remote copy.

It is an object of the present invention to provide a management apparatus, a management method, and a storage system in which even in an environment in which a connection speed and an amount of data written from a host are uncertain, a remote copy can be stably operated.

To solve the above problem, the present invention is a management apparatus having a processor that manages a plurality of storage apparatuses that communicating with each other via a network and having a respective volume. In the management apparatus, a remote copy transferred from a replication source volume of a plurality of the volumes to a replication destination volume and duplicated is set for a combination of a plurality of replication source volumes and replication destination volumes. A replication delay time, which is a time required for duplicating a remote copy, is monitored and control is exercised to limit an amount of transferred data of other remote copies based on the replication delay time. In this case, a management apparatus can be provided which management apparatus enables a remote copy to be stably operated even in an environment in which a connection speed and an amount of data written from a host are uncertain.

Here, objective information, which is, for example, a remote copy performant objective, including an objective value of replication delay time, is provided and an amount of transferred data of other remote copies having an influence on remote copy is limited so that the remote copy meets the replication delay time as the objective information. In this case, while required performance is fulfilled, a remote copy can be stably operated.

In addition, for example, a replication source volume accepts a write request and stores data; the data stored in the replication source volume is duplicated in a replication destination volume by remote copy and the management apparatus limits data write to the replication source volume related to other remote copies and thereby limits an amount of transferred data of other remote copies. In this case, a replication delay time can be recovered.

Further, objective information includes, for example, an amount of write accepted by a replication source volume and the management apparatus limits an amount of transferred data of other remote copies based on a write amount and a replication delay time in the objective information. In this case, by limiting a write amount, a transfer speed from a replication source volume to a replication destination volume can be indirectly limited and a replication delay time can be recovered.

Further, for example, a replication source volume accepts a write request and stores data; the data stored in the replication source volume is duplicated to a replication destination volume by remote copy; objective information includes a write amount accepted by the replication source volume; and the management apparatus limits data write to the replication source volume related to remote copy based on a write amount and a replication delay time in the objective information and thereby improves a replication delay time in remote copy. In this case, a remote copy can be stably operated.

Further, for example, when a plurality of other remote copies becomes a candidate of amount of transferred data limit objective, another remote copy subjected to transfer limit is determined based on a difference between the performance information of other remote copies and the objective information thereof. In this case, a remote copy most lacking in requested performance can be more easily determined.

Further, for example, when a remote copy is newly set for a replication source volume with data stored therein, initial copy is performed to duplicate the stored data; and when a plurality of other remote copies becomes a candidate of amount of transferred data limit objective, the management apparatus stops other remote copies whose operating status is initial copy. In this case, a resource for initial copy requiring much time can be assigned to remote copies whose replication delay time does not meet a predetermined range.

Further, for example, with respect to a plurality of remote copies, remote copies for which at least either of a storage apparatus in which a replication source volume is installed and a storage apparatus in which a replication destination volume is installed is common are grouped; and other remote copies whose amount of transferred data is limited are selected from the same group as a remote copy related to replication delay time. In this case, other remote copies can be selected from between remote copies prone to have influence on each other.

Further, for example, an amount of transferred data of a remote copy is limited so that a plurality of remote copies in an identical group will be substantially identical in replication delay time. In this case, an amount of transferred data can be adjusted between remote copies prone to have influence on each other.

Further, for example, with a journal usage rate of a remote copy of journal-based system taken into account, other remote copies whose transfer is limited are selected. In this case, even when a remote copy is of journal-based system, the remote copy can be stably operated.

The present invention is a management method in which a management apparatus having a processor manages a plurality of storage apparatuses communicating with each other via a network and having a respective volume. In the management method, a remote copy transferred from a replication source volume of a plurality of the volumes to a replication destination volume via a network and duplicated is set for a combination of a plurality of replication source volumes and replication destination volumes; and the management apparatus monitors a replication delay time, which is a time required for duplicating a remote copy and exercises control to limit an amount of transferred data of other remote copies based on the replication delay time. In this case, a management method in which even in an environment in which a connection speed and an amount of data written from a host are uncertain, a remote copy can be stably operated can be provided.

Further, the present invention is a storage system including a plurality of storage apparatuses communicating with each other via a network and having a respective volume and a management apparatus that has a processor and manages the storage apparatuses. In the storage system, a remote copy transferred from a replication source volume of a plurality of the volumes to a replication destination volume via a network and duplicated is set for a combination of a plurality of replication source volumes and replication destination volumes; and the management apparatus monitors a replication delay time, which is a time required for duplicating a remote copy, and exercises control to limit an amount of transferred data of other remote copies based on the replication delay time. In this case, a storage system in which even in an environment in which a connection speed and an amount of data written from a host are uncertain, a remote copy can be stably operated can be provided.

According to the present invention, a management apparatus, a management method, and a storage system capable of stably operating a remote copy even in an environment in which a connection speed and an amount of data written from a host are uncertain can be provided.

BRIEF DESCRIPTION OF THE DRAWINGS

FIG. 4 is a drawing illustrating an example of a composition of storage apparatus information in the present embodiment;

FIG. 5 is a drawing illustrating an example of a composition of remote copy configuration information in the present embodiment;

FIG. 6 is a drawing illustrating an example of a composition of throttling setting information in the present embodiment;

FIG. 7 is a drawing illustrating an example of a composition of service level objective information in the present embodiment;

FIG. 8 is a drawing illustrating an example of a composition of remote copy performance information in the present embodiment;

FIG. 9 is a drawing illustrating an example of a composition of service level objective excess and shortage ratio information in the present embodiment;

FIG. 10 is a drawing illustrating a flow of processing for a remote copy construction unit of a management system to construct a remote copy in accordance with a request from a user of a storage apparatus, shown at Steps S1 to S3 in FIG. 1;

FIG. 11 is a drawing illustrating a flow of processing for an apparatus monitoring unit of a management system to monitor each storage apparatus, shown at Steps S4 to S5 in FIG. 1;

DETAILED DESCRIPTION

Hereafter, a detailed description will be given to an embodiment of the present invention with reference to the accompanying drawings. However, the following description and drawings are an example for explaining the present invention and are appropriately omitted or simplified for clarification of the explanation and do not limit the technical scope of the present invention.

When the contents of varied information are explained in the following description, such expressions as "identification information," "identifier," "appellation," "name," "ID," "number," and the like will be used but these expressions are substitutable for one another.

In the following description, a "program" may be used as a subject of an explanation sometimes; however, a program is executed by a processor (for example, CPU (Central Processing Unit) or GPU (Graphics Processing Unit)) and thereby performs predetermined processing appropriately using a storage resource (for example, memory), an interface device (for example, communication apparatus), or the like and thus a processor may be taken as a subject of the explanation. Similarly, a main body of processing performed by executing a program may be, for example, a controller, an apparatus, a system, a computer, a node, a storage apparatus, a server, a client, or a host having a processor. Part or all of a program may be processed using a hardware circuit.

Various programs may be installed in each computer through a program delivery server or a storage medium. In the following description, two or more programs may be implemented as one program or conversely, one program may be implemented as two or more programs.

Overall Description of Storage System 0100

First, a description will be given to the outline of an embodiment with reference to FIG. 1. Since the description here simply explains the whole of the embodiment, details may be omitted sometimes. The details of each component and each processing will be described later.

Figure 1:
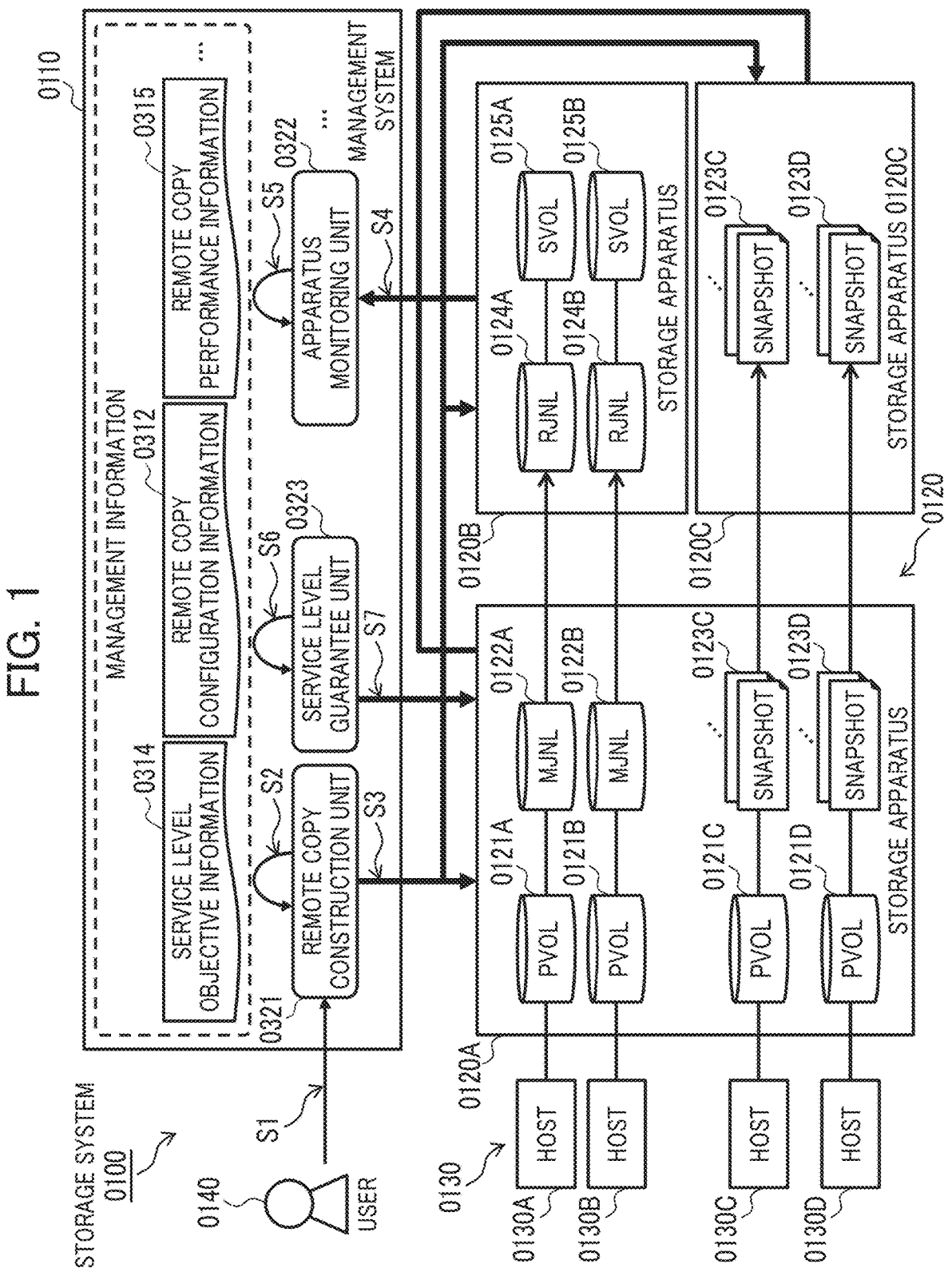
FIG. 1 is a drawing illustrating an overall configuration of a storage system according to an embodiment and an outline of the operation thereof.

FIG. 1 is a drawing illustrating the overall configuration of a storage system 0100 according to the present embodiment and an outline of the operation thereof.

The storage system 0100 shown in FIG. 1 is comprised of a management system 0110, a plurality of storage apparatuses 0120, and a plurality of hosts 0130. Though not constituting the storage system 0100, a user 0140 is also illustrated together.

The management system 0110 is an example of a management apparatus and is a computer apparatus that manages a plurality of the storage apparatuses 0120 communicating with each other via a network and having a respective volume. The management system 0110 constructs a remote copy in place of a user 0140 of a storage apparatus 0120, manages a service level objective (performance required when a remote copy is made), and performs other like operations. The management system 0110 is, for example, a server computer running on a cloud and provides the user 0140 with a service of making a remote copy.

The storage apparatus 0120 is a computer apparatus that provides a host 0130 with a logical storage area designated as volume. The storage apparatus 0120 shown in the drawing is comprised of storage apparatuses 0120A to 0120C. The storage apparatus 0120A has a function of duplicating data of a volume to other storage apparatus 0120B to 0120C installed in a remote location. That is, a replication source volume accepts a write request and stores data and the data stored in the replication source volume is duplicated in a replication destination volume by remote copy.

The host 0130 is a computer apparatus that, in accordance with a request from an application program executing on the host 0130, sends a data read request or write request with respect to a volume provided from a storage apparatus 0120. The host 0130 shown in the drawing is comprised of hosts 0130A to 0130D. In the example in FIG. 1, the storage apparatus 0120A provides volumes PVOL0121A to PVOL0121D respectively to the hosts 0130A to 0130D.

With respect to the storage system 0100 shown in the drawing, it can also be described that a remote copy transferred from a replication source volume of a plurality of volumes to a replication destination volume via a network and duplicated is set for a combination of a plurality of replication source volumes and replication destination volumes.

As mentioned above, the remote copy system includes journal-based system and snapshot-based system. In the case of FIG. 1, in the volumes PVOL0121A to PVOL0121B, a remote copy of journal-based system is constructed and, in the volumes PVOL0121C to PVOL0121D, a remote copy of snapshot-based system is constructed.

These remote copy systems themselves are of existing technologies; therefore, though with respect to the present embodiment, a detailed description will be omitted, a brief description will be given to the outline of operation and a problem caused by the operation.

The outline of operation of a remote copy of journal-based system is as follows:

First, the hosts 0130A to 0130B write data into the replication source volumes PVOL0121A to PVOL0121B of the replication source storage apparatus 0120A. As a result, the write request is stored as a log in master journal areas MJNL0122A to MJNL0122B.

Thereafter, the log is transferred from the replication source storage apparatus 0120A to the replication destination storage apparatus 0120B and the log is stored in restore journal areas RJNL0124A to RJNL0124B.

Finally, the log is taken out of the restore journal areas RJNL0124A to RJNL0124B at the replication destination storage apparatus 0120B and is reflected in the replication destination volumes SVOL0125A to SVOL0125B; the data is thereby duplicated between PVOL0121A to PVOL0121B and SVOL0125A to SVOL0125B.

When a remote copy is constructed in a volume with data already written therein, initially, all the data of the replication source volumes PVOL0121A to PVOL0121B is transferred to the replication destination volumes SVOL0125A to SVOL0125B (initial copy); and then the operation is switched to the above-mentioned operation. In this case, the initial copy refers to that, when a remote copy is newly set for a replication source volume with data stored therein, the stored data is duplicated.

The processing of the above-mentioned generation, transfer, and reflection of a log is all asynchronously performed; therefore, some degree of delay is produced until data written into the replication source volumes PVOL0121A to PVOL0121B by the hosts 0130A to 0130B is reflected in the replication destination volumes SVOL0125A to SVOL0125B.

If a speed at which a log is transferred between the replication source storage apparatus 0120A and the replication destination storage apparatus 0120B is insufficient for an amount (rate) of data written into the replication source volumes PVOL0121A to PVOL0121B by the hosts 0130A to 0130B, a log that is retained in the master journal areas MJNL0122A to MJNL0122B is increased in number; and as a result, a delay before the log is reflected in the distribution destination volumes SVOL0125A to SVOL0125B is extended.

During this period during which a delay is being produced, data is not duplicated and if a failure occurs during the period, the data will be lost. Though the data that a log transfer to the restore journal areas RJNL0124A to RJNL0124B has been completed is strictly not lost but this regard will not be considered here.

A journal area indicated as the master journal areas MJNL0122A to MJNL0122B and the restore journal areas RJNL0124A to RJNL0124B has a limited capacity; therefore, if a period during which a log transfer speed is insufficient lasts too long and the journal area becomes too full to store a new log, the operation of remote copy cannot be maintained.

For this reason, in remote copy of journal-based system, a system must be appropriately designed and operated so that replication delay time<RPO (Recovery Point Objective).

Specifically, a system is designed and operated by limiting an IO (Input/Output) amount accepted from the hosts 0130A to 0130B according to an available transfer speed to suppress a number of generated logs or adjusting a transfer speed of each remote copy to the extent that a journal area will not become full in an environment in which a plurality of remote copies is constructed.

However, as mentioned above, in such a configuration as hybrid cloud, an actual transfer speed is unstable and adoption of such operation is not practical.

If an IO amount accepted from a host 0130 is limited, the operation of the host 0130 will be influenced and the degree of the influence will depend on an unstable transfer speed and this is problematic.

Subsequently, the outline of operation of a remote copy of snapshot-based system is as follows:

First, the storage apparatus 0120A periodically acquires snapshots Snapshot0123C to Snapshot0123D of the replication source volumes PVOL0121C to PVOL0121D.

Snapshot0123C to Snapshot0123D are a virtual copy of PVOL0121C to PVOL0121D obtained when a snapshot is acquired and a data object obtained by storing only a difference from the previously acquired snapshot as a data entity.

After acquisition of a snapshot, the storage apparatus 0120A transfers (data objects of) Snapshot0123C to Snapshot0123D to the replication destination storage apparatus 0120C.

In remote copy of snapshot-based system, data replication processing is completed here.

If data in a replication source volume becomes required to be restored because of an occurrence of a failure in the replication source strange apparatus 0120A or for some other like reason, the replication source volumes PVOL0121C to PVOL0121D can be restored by applying Snapshot0123C to Snapshot0123D stored in the replication destination storage apparatus 0120C from the beginning.

To construct a remote copy later for a volume with data already written therein, like journal-based system, initially, Snapshot0123C to Snapshot0123D containing all the data of the replication source volumes PVOL0121C to PVOL0121D as a difference are transferred to the replication destination storage apparatus 0120C (initial copy) and then the operation is switched to the above-mentioned operation.

As mentioned above, in remote copy of snapshot-based system, data is replication by periodically acquiring and transferring a snapshot.

During a period from when a snapshot is acquired in some cycle to when transfer of a snapshot in the next cycle is terminated (replication delay time), data is not duplicated and if a failure occurs during this period, the data will be lost.

When an amount (rate) of data written into the replication source volumes PVOL0121C to PVOL0121D by the hosts 0130C to 0130D is increased, an amount of differential data contained in the snapshots Snapshot0123C to Snapshot0123D is accordingly increased and a replication delay time is extended.

For this reason, also in remote copy of snapshot-based system, a system must be appropriately designed and operated so that replication delay time<RPO (Recovery Point Objective).

Specifically, a system is designed and operated by limiting an IO (Input/Output) amount accepted from the hosts 0130C to 0130D according to an available transfer speed to suppress a number of generated differences or adjusting a transfer speed of each remote copy in an environment in which a plurality of remote copies is constructed.

However, as mentioned above, in such a configuration as hybrid cloud, an actual transfer speed is unstable and adoption of such operation is not practical.

If an IO amount accepted from a host 0130 is limited, the operation of the host 0130 will be influenced and the degree of the influence will depend on an unstable transfer speed and this is problematic.

Up to this point, a description has been given to the operation of a remote copy function and difficulty in the designing and operation of a system caused thereby. In the present embodiment, the above problem is solved by the management system 0110 performing the processing described below:

The management system 0110 is a system that operates a remote copy with the above-mentioned replication delay time and usage ratio of a journal area taken into account in place of a user 0140 of a storage apparatus 0120.

Specifically, the management system 0110 collects performance information (remote copy performance information 0315) related to remote copy such as replication delay time, from a storage apparatus 0120. Then, the management system 0110 dynamically adjusts throttling for remote copy so that RPO set as a service level objective by a user 0140 will be maintained.

At this time, the user 0140 is let to set a service level objective with respect to not only RPO but also a performance item, such as lower-limit IO amount, that has influence on the operation of the host 0130 and the management system 0110 makes adjustment so as to keep each service level objective; and both maintenance of RPO and the stable operation of the host 0130 are thereby achieved.

First, a description will be given to the outline of the operation of the management system 0110 with reference to FIG. 1.

The management system 0110 has, as a control program 0320, a remote copy construction unit 0321, a service level guarantee unit 0323, and an apparatus monitoring unit 0322.

Further, as management information 0310, service level objective information 0314, remote copy configuration information 0312, and remote copy performance information 0315 are provided.

Hereafter, a description will be given to the outline of the operation of the management system 0110 in the present embodiment, shown by Steps S1 to S7.

Steps S1 to S3 are processing in which the management system 0110 constructs a remote copy in accordance with a request from a user 0140 of a storage apparatus 0120.

To construct a remote copy, conventionally, the user 0140 gives the storage apparatus 0120 information of a replication source and a replication destination (information of volumes of a replication source and a replication destination, information of a journal area to be used, and the like).

In the present embodiment, meanwhile, the user 0140 gives the management system 0110 information of a service level objective for a constructed remote copy in addition to the above-mentioned information and then instructs to construct the remote copy (Step S1). The service level objective is performance required when a remote copy is made. Specifically, the service level objective includes RPO, a least IO amount (lower-limit IO amount) required to issue to the replication source volume (PVOL0121A to PVOL0121D, and the like) for the stable operation of the host 0130, and the like.

The management system 0110 that accepted an instruction to construct the remote copy from the user 0140 stores the information given by the user 0140 in the service level objective information 0314 and the remote copy configuration information 0312 (Step S2).

Further, the management system 0110 instructs each storage apparatus 0120 to construct the remote copy in accordance with the contents of the instruction (Step S3).

Steps S4 to S5 are processing in which the management system 0110 monitors each storage apparatus 0120.

The management system 0110 periodically communicates with each storage apparatus 0120 and collects performance information related to remote copy (Step S4).

Then, the management system 0110 stores the collected information in the remote copy performance information 0315 (Step S5). Specifically, the performance information includes an IO amount issued to a replication source volume by the host 0130, a replication delay time, and the like.

Steps S6 to S7 are processing in which the management system 0110 adjusts the operation of replication processing at each storage apparatus 0120 to guarantee a service level objective set for each remote copy.

The management system 0110 references to the remote copy performance information 0315 and the service level objective information 0314 (Step S6).

Then, when a replication delay time exceeds RPO, the management system 0110 sets throttling for varied processing related to remote copy so as to reduce an amount of data transferred from the replication source storage apparatus 0120 to the replication destination storage apparatus 0120 (Step S7).

Examples of the contents of throttling setting are limitation of an IO amount that can be issued to the replication source volume by the host 0130, limitation of a transfer speed of a log, a snapshot, and the like; and the service level guarantee unit 0323 makes appropriate setting so that a violation of a service level objective (RPO or lower-limit IO amount) will not be caused.

Up to this point, a description has been given to an example of the configuration of the storage system 0100 in the present embodiment but the above description is narrowed down to a part related to the essence of the present embodiment and any other component may be included as required.

Figure 2:
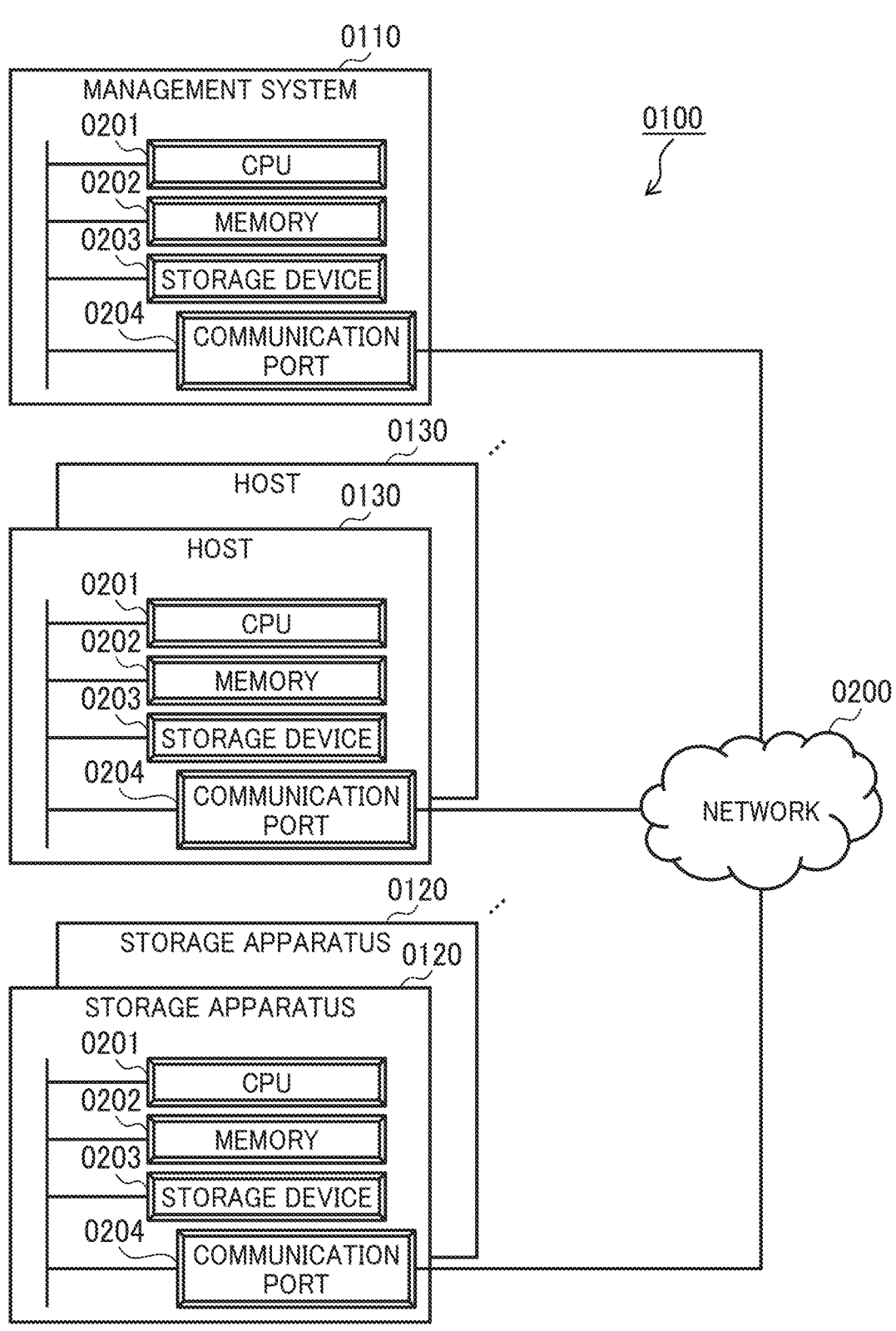
FIG. 2 is a drawing illustrating of a hardware configuration of a storage system in the present embodiment.

FIG. 2 is a drawing illustrating a hardware configuration of the storage system 0100 in the present embodiment.

The storage system 0100 is comprised of one management system 0110, two or more storage apparatuses 0120 (one or more replication source {storage apparatuses} and one or more replication destination storage apparatuses 0120), and one or more hosts 0130.

Various components constituting the storage system 0100 need not be installed at an identical site and the storage system may be so configured that, for example, the replication source storage apparatus 0120 and replication destination storage apparatus 0120 of a remote copy are installed in different data centers and the management system 0110 is installed in a cloud.

Similarly, a plurality of components constituting the storage system 0100 may be physically configured of a single apparatus.

Like Hyper Converged Infrastructure, for example, a configuration in which the functions of the management system 0110, storage apparatus 0120, and host 0130 reside together in a single physical server may be adopted.

Each of the management system 0110, storage apparatus 0120, and host 0130 is a computer apparatus comprised of CPU 0201, a memory 0202, a storage device 0203, and a communication port 0204 but a strict configuration does not matter as long as each can fulfill a respective role described later.

With respect to the management system 0110, storage apparatus 0120, and host 0130, a plurality of these components may be equipped or any other component than described above may be equipped. For example, a plurality of hard disk drives may be equipped as the storage device 0203 for redundancy or such an accelerator as GPU may be equipped to take over part of the processing performed at the CPU 0201. Further, each component need not be physical hardware and may be virtual hardware, such as a virtual machine and container, based on virtualization technologies. Similarly, a configuration in which a service that executes a program without paying attention to an actual computing environment, like Function-as-a-Service or Serverless Computing, is used may be adopted. Further, similarly, a configuration in which an object storage service (AWS S3 or the like) on a cloud is used as the replication destination storage apparatus 0120 in snapshot-based system may be adopted.

Each component constituting the storage system 0100 is respectively connected to a network 0200 and can communicate with each other.

The network 0200 is implemented by such an arbitrary network connection as Ethernet, InfiniBand, optical fiber, and the like and a combination thereof.

In addition, not only LAN (Local Area Network) closed within a data center but also such WAN (Wide Area Network) as Internet and a virtual network within a computer may be included. Though not shown in the drawing, such a network device as network switch, router, and gate way may be included as required. Further, the drawing shows a configuration in which all the components are connected to one network 0200 but a dedicated network used between specific components may be provided. For example, SAN (Storage Area Network) using Fibre Channel may be provided for high-speed connection between the storage apparatus 0120 and the host 0130.

Detailed Description of Configuration of Management System 0110

A detailed description will be given to the management system 0110.

Figure 3:
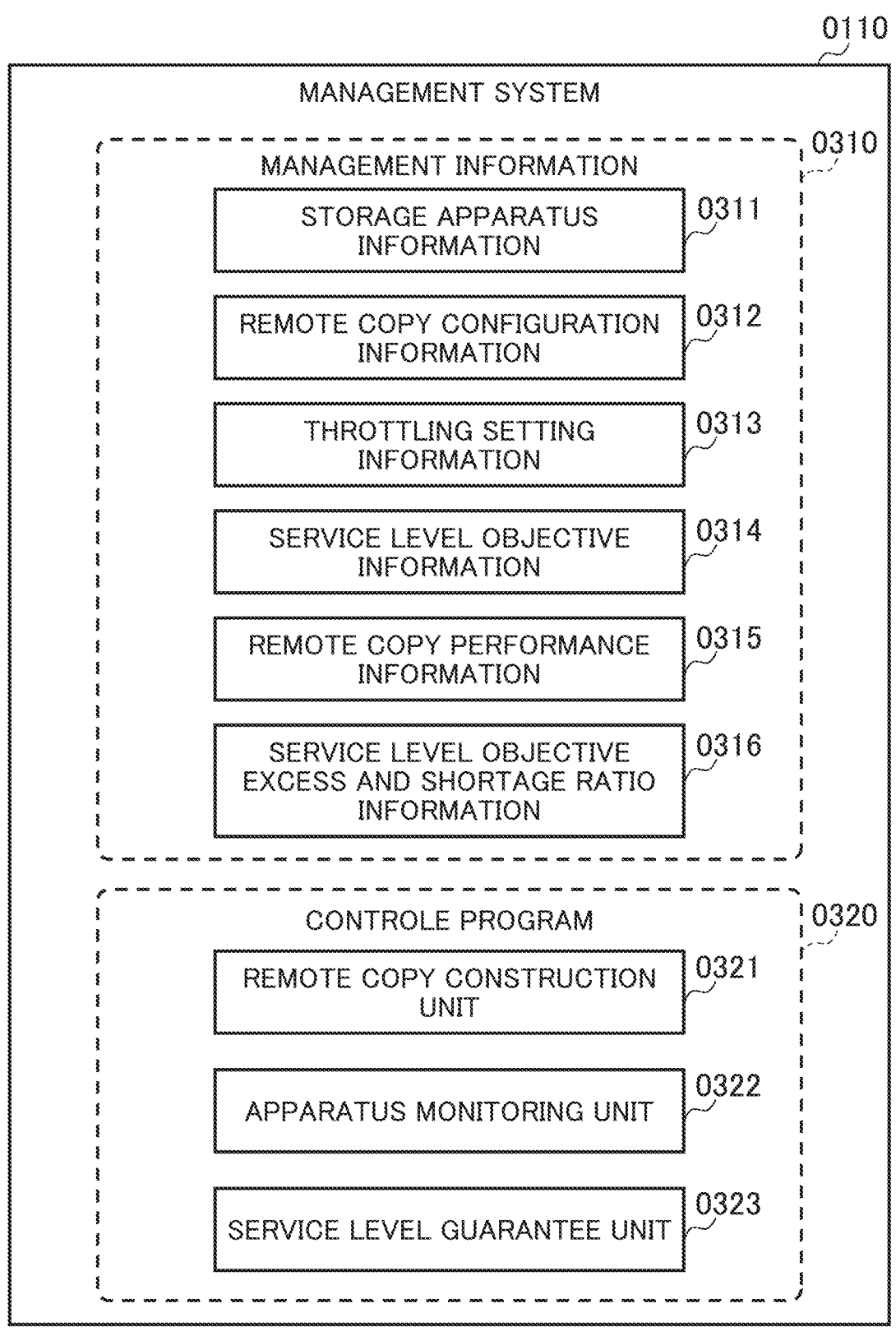
FIG. 3 is a drawing illustrating an example of a functional configuration of a management system in the present embodiment.

FIG. 3 is a drawing illustrating an example of a functional configuration of the management system 0110 in the present embodiment.

The management system 0110 has, as management information 0310, storage apparatus information 0311, remote copy configuration information 0312, throttling setting information 0313, service level objective information 0314, remote copy performance information 0315, and service level objective excess and shortage ratio information 0316.

Further, the management system 0110 includes, as a control program 0320, a remote copy construction unit 0321, an apparatus monitoring unit 0322, and a service level guarantee unit 0323.

These pieces of the management information 0310 and the control program 0320 are stored in any storage device 0203 or memory 0202 according to a computing environment in which the management system 0110 operates.

The control program 0320 is executed using the CPU 0201 and the memory 0202 and reads and writes the management information 0310 in accordance with the program and communicates with the storage apparatus 0120 using the communication port 0204.

The storage apparatus information 0311 is information for the management system 0110 to manage the information of a storage apparatus 0120 to be managed.

The remote copy configuration information 0312 is information for the management system 0110 to manage the configuration of a remote copy to be managed.

The throttling setting information 0313 is information for the management system 0110 to manage the details of throttling set for each remove copy to maintain a service level objective.

The service level objective information 0314 is information to manage the details of a service level objective for each remote copy that requested to the management system 0110 by the user 0140.

The remote copy performance information 0315 is information for the management system 0110 to manage performance information related to replication processing collected from each storage apparatus 0120.

The service level objective excess and shortage ratio information 0316 is information for the management system 0110 to manage the degree of attainment of a service level objective set for each remote copy.

The remote copy construction unit 0321 is a program for the management system 0110 to construct a remote copy in accordance with a request from the user 0140. Though the details will be described later, the remote copy construction unit 0321 functions as a performance information acquisition unit that acquires performance information as the information of performance required when a remote copy is made.

The apparatus monitoring unit 0322 is a program for the management system 0110 to monitor each storage apparatus 0120 under the management thereof and collect performance information related to replication processing. Though the details will be described later, the apparatus monitoring unit 0322 monitors a replication delay time which is a time required to duplicate a remote copy.

The service level guarantee unit 0323 is a program for the management system 0110 to maintain a service level objective for each remote copy. Though the details will be described later, the service level guarantee unit 0323 exercises control to limit an amount of transferred data of other remote copies based on a replication delay time.

FIG. 4 is a drawing illustrating an example of the composition of storage apparatus information 0311 in the present embodiment.

The storage apparatus information 0311 is information for the management system 0110 to manage the information of a storage apparatus 0120 to be managed.

The entries of the storage apparatus information 0311 include apparatus ID 0400, apparatus name 0401, storage classification 0402, machine type 0403, and connection information 0404.

The apparatus ID 0400 is information for the management system 0110 to uniquely identify a storage apparatus 0120. In FIG. 4, the apparatus ID 0400 is a serial number but need not be a serial number and may be ID using any other character than numeric character.

The apparatus name 0401 is information for the user 0140 to easily identify a storage apparatus 0120.

The storage classification 0402 and the machine type 0403 are respectively information indicating the type of a storage apparatus 0120. These are information for discriminating a functional difference from storage apparatus to storage apparatus 0120 when an object storage on a cloud is used as a replication destination storage apparatus 0120 or on other like occasions.

The connection information 0404 is information used by the management system 0110 to communicate with a storage apparatus 0120. In FIG. 4, the connection information 0404 shows IP (meaning an IP address) and AccessToken (meaning authentication information) but may contain any other information as required.

The example in FIG. 4 shows that, with respect to a storage apparatus 0120 whose apparatus ID 0400 is "0," the apparatus name 0401 is "Primary-Str"; the storage classification 0402 is "block"; the machine type 0403 is "Block-Model-X"; and the IP address of the connection information 0404 is "1.1.1.1" and the AccessToken thereof is "abc . . . ."

For the storage apparatus information 0311, a new entry is added when a new storage apparatus 0120 is added to the management target of the management system 0110.

FIG. 5 is a drawing illustrating an example of the composition of remote copy configuration information 0312 in the present embodiment.

The remote copy configuration information 0312 is information for the management system 0110 to manage the configuration of a remote copy to be managed.

The entries of the remote copy configuration information 0312 include replication ID 0500, replication name 0501, replication mode 0502, replication source information 0503, replication destination information 0504, and replication group ID 0505.

The replication ID 0500 is information for the management system 0110 to uniquely identify a configuration of a remote copy. In FIG. 5, the replication ID 0500 is a serial number but need not be a serial number and may be ID using any other character than numeric character.

The replication name 0501 is information for the user 0140 to easily identify a configuration of a remote copy.

The replication mode 0502 is information indicating the above-mentioned system of replication processing, journal-based system or snapshot-based system.

The replication source information 0503 and the replication destination information 0504 are information respectively indicating a replication source and a replication destination in a configuration of a remote copy. In FIG. 5, in the replication source information 0503 and the replication destination information 0504, apparatus ID 0400 and VOL ID (ID of volume to be duplicated) and, only in case of journal-based system, JNL ID (ID of a journal area to be used) are contained but any other information may be contained as required. For example, when an object storage is used as a replication destination storage apparatus 0120 in remote copy of snapshot-based system, the identification information of a bucket into which an object is stored may be contained.

The replication group ID 0505 is information for identifying a group set when remote copies that involve a bottleneck part causing degradation in RPO in common are grouped. Grouping of remote copies will be described later.

In the example in FIG. 5, with respect to a remote copy whose replication ID 0500 is "0," the replication name 0501 is "App-A"; the replication mode 0502 is "journal" (journal-based system); the replication source apparatus ID 0400 is "0"; the ID of the replication source volume is "100"; the ID of a journal area used at the replication source is "10"; the replication destination apparatus ID 0400 is "1"; the replication destination volume ID is "200"; and the ID of a journal area used at the replication destination is "20." Further, the example shows that a remote copy whose replication ID 0500 is "O" and a remote copy whose replication ID 0500 is "1" involve a bottleneck part causing degradation in RPO in common.

With respect to the remote copy configuration information 0312, a new entry is added when the management system 0110 constructs a new remote copy in accordance with a request from the user 0140.

FIG. 6 is a drawing illustrating an example of a composition of throttling setting information 0313 in the present embodiment.

The throttling setting information 0313 is information for the management system 0110 to manage the details of throttling set for each remove copy to maintain a service level objective.

The entries of the throttling setting information 0313 include replication ID 0500, host IO limitation 0600, inter-apparatus transfer speed limitation 0601, and initial copy operation limitation 0602.

The replication ID 0500 is information for the management system 0110 to uniquely identify a configuration of a remote copy and is used to bring information in remote copy configuration information 0312 into correspondence with information in throttling setting information 0313.

The host IO limitation 0600 is information indicating the details of limitation related to an IO amount that can be issued by the host 0130, set for a replication source volume of the relevant remote copy.

The inter-apparatus transfer speed limitation 0601 is details indicating the details of limitation related to a transfer speed between replication source and replication destination storage apparatuses 0120, set for the relevant remote copy.

The initial copy operation limitation 0602 is details indicating the details of limitation related to initial copy, set for the relevant remote copy.

The example in FIG. 6 shows that no limitation is imposed on remote copies whose replication ID 0500 is "0" or "2" and a remote copy whose replication ID 0500 is "1" is so set that an IO amount that can be issued by the host 0130 is limited to "7.5 k IOPS." A remote copy whose replication ID 0500 is "3" is so set that a transfer speed between storage apparatuses 0120 is limited to "20 MB/s,"

and a remote copy whose replication ID 0500 is "4" is so limited that an initial copy is "stopped."

With respect to the throttling setting information 0313, a new entry is added when the management system 0110 constructs a new remote copy in accordance with a request from the user 0140.

As items to be adjusted for maintaining a service level objective, the management system 0110 in the present embodiment utilizes three limitations: limitation of an IO amount issued by a host 0130, limitation of transfer speed between storage apparatuses 0120, and limitation of initial copy operation; therefore, the management system manages information corresponding thereto as host IO limitation 0600, inter-apparatus transfer speed limitation 0601, and initial copy operation limitation 0602. However, the management system 0110 may impose any other limitation than these three items and may add information corresponding to the details of the limitation to throttling setting information 0313.

FIG. 7 is a drawing illustrating an example of a composition of service level objective information 0314 in the present embodiment.

The service level objective information 0314 is information to manage the details of a service level objective for each remote copy that requested to the management system 0110 by the user 0140.

The entries of service level objective information 0314 include replication ID 0500, lower-limit IO amount 0700, and RPO 0701.

The replication ID 0500 is information for the management system 0110 to uniquely identify a configuration of a remote copy and is used to bring information in remote copy configuration information 0312 into correspondence with information in service level objective information 0314.

The lower-limit IO amount 0700 is information indicating a service level objective related to a lower limit of an amount of IO issued by a host 0130 to a replication source volume of the relevant remote copy and accepted by the replication source volume.

The RPO 0701 is information indicating a service level objective related to a replication delay time produced in the relevant remote copy.

In this case, it can also be described that the management system 0110 has service level objective information 0314 as objective information that is a performance objective of a remote copy and includes an objective value of replication delay time. It can also be described that service level objective information 0314 as objective information includes a lower-limit IO amount 0700 as a write amount accepted by a replication source volume.

The example in FIG. 7 shows that a remote copy whose replication ID 0500 is "0" is requested "10 k IOPS" of lower-limit IO amount 0700 and "30 sec" of RPO 0701 as service level objective from the user 0140.

With respect to service level objective information 0314, a new entry is added when the management system 0110 constructs a new remote copy in accordance with a request from a user 0140.

The management system 0110 in the present embodiment is configured to manage a remote copy so as to fulfill two types of service level objectives, lower-omit IO amount 0700 and RPO 0701 shown in FIG. 7. In this case, performance information important to stably make a remote copy can be set. However, the present invention is not limited to these items and may be provided with any other service level objective item than described above. For example, a configuration in which time until an initial copy is completed can also be set as service level objective may be adopted. In this case, the present invention can be configured so that an adjustment is made so as not to violate a service level objective related to initial copy during processing of adjusting throttling to guarantee a service level objective, described later.

In the present embodiment, a service level objective is handled as an objective that must be always guaranteed but the present invention is not limited to this. For example, the present invention may be configured so that an extent to which a service level objective may be violated can be set, for example, such that "a service level objective is guaranteed during a period of 99% of the most recent one month (a violation is permitted during 1% (approximately 7 hours) of one month)." In this case, the management system 0110 manages a remaining time (generally, referred to as error budget) during which a violation of a service level objective is permitted in service level objective information 0314 and service level objective excess and shortage ratio information 0316. The management system 0110 can be so configured that, in processing of adjusting throttling for guaranteeing a service level objective, described later, throttling that intentionally violates a service level objective is permitted within a range within which an error budget has a margin.

FIG. 8 is a drawing illustrating an example of a composition of remote copy performance information 0315 in the present embodiment.

The remote copy performance information 0315 is information for the management system 0110 to manage performance information related to replication processing collected from each storage apparatus 0120.

The entries of remote copy performance information 0315 include replication ID 0500, operation status 0800, host IO amount 0801, replication delay 0802, journal usage ratio 0803, and inter-apparatus transfer speed 0804.

The replication ID 0500 is information for the management system 0110 to uniquely identify a configuration of a remote copy and is used to bring information in remote copy configuration information 0312 into correspondence with information in remote copy performance information 0315.

The operation status 0800 is information indicating the present operation of replication processing, for example, whether initial copy is underway with respect to the relevant remote copy.

The host IO amount 0801 is information indicating an IO amount issued to a replication source volume of the relevant remote copy by a host 0130.

The replication delay 0802 is information indicating a time from when a host 0130 writes a replication source volume to when the writing is duplicated in a replication destination storage apparatus 0120 in the relevant remote copy.

The journal usage ratio 0803 is information indicating a usage ratio of a master journal area MJNL 0122 utilized at a replication source of the relevant remote copy in remote copy of journal-based system.

The inter-apparatus transfer speed 0804 is information indicating a communication band between a replication source storage apparatus 0120 and a replication destination storage apparatus 0120, used for transferring data related to a remote copy in the relevant remote copy.

The example in FIG. 8 shows that, with respect to a remote copy whose replication ID 0500 is "0," the operation status 0800 is "ordinary"; the host IO amount 0801 is "12 k IOPS"; the replication delay 0802 is "31 sec"; the journal usage ratio 0803 is "20%"; and the inter-apparatus transfer speed 0804 is "63 MB/s." The example shows that, with respect to a remote copy whose replication ID 0500 is "2," the replication mode 0502 is "snapshot" (Refer to FIG. 5) and thus, the journal usage ratio 0803 is "N/A." Further, the example shows that, with respect to a remote copy whose replication ID 0500 is "4," the operation status 0800 is "initial copy" and replication processing is not in an operational situation; therefore, the replication delay 0802 and the journal usage ratio 0803 are "N/A."

With respect to remote copy performance information 0315, a new entry is added or an existing entry is updated during processing in which the apparatus monitoring unit 0322 of the management system 0110 acquires information related to a remote copy from a storage apparatus 0120.

FIG. 9 is a drawing illustrating an example of a composition of service level objective excess and shortage ratio information 0316 in the present embodiment.

The service level objective excess and shortage ratio information 0316 is information for the management system 0110 to manage the degree of attainment of a service level objective set for each remote copy.

The entries of service level objective excess and shortage ratio information 0316 include replication ID 0500, lower-limit IO amount excess and shortage ratio 0900, RPO excess and shortage ratio 0901, maximum excess and shortage ratio 0902, and minimum excess and shortage ratio 0903.

The excess and shortage ratio is information in which 100% means a situation in which a service level objective is just attained; less than 100% means a situation in which an objective is violated; above 100% means a situation in which a margin is present to attain an objective.

The replication ID 0500 is information for the management system 0110 to uniquely identify a configuration of a remote copy and is used to bring information in remote copy configuration information 0312 into correspondence with information in service level objective excess and shortage ratio information 0316.

The lower-limit IO amount excess and shortage ratio 0900 is information indicating a degree of attainment of a service level objective of lower-limit IO amount 0700 set for the relevant remote copy.

The RPO excess and shortage ratio 0901 is information indicating a degree of attainment of a service level objective of RPO 0701 set for the relevant remote copy.

The maximum excess and shortage ratio 0902 is information indicating an excess and shortage ratio of an item highest in excess and shortage ratio among the service level objectives set for the relevant remote copy.

The minimum excess and shortage ratio 0903 is information indicating an excess and shortage ratio of an item lowest in excess and shortage ratio among the service level objectives set for the relevant remote copy.

The example in FIG. 9 shows that, with respect to a remote copy whose replication ID 0500 is "0," the lower-limit IO amount excess and shortage ratio 0900 is "120%" (a state in which a margin is present for a service level objective); the RPO excess and shortage ratio 0901 is "97%" (a state in which a service level objective is violated); the maximum excess and shortage ratio 0902 is "120%"; and the minimum excess and shortage ratio 0903 is "97%."

With respect to service level objective excess and shortage ratio information 0316, a new entry is added or an existing entry is updated during processing in which the service level guarantee unit 0323 of the management system 0110 determines the details of throttling adjustment.

In the present embodiment, the management system 0110 manages two types of service level objectives, lower-limit IO amount 0700 and RPO 0701, in service level objective information 0314. For this reason, also in service level objective excess and shortage ratio information 0316, the management system 0110 manages lower-limit IO amount excess and shortage ratio 0900 and RPO excess and shortage ratio 0901 corresponding thereto.

As described in relation to remote copy performance information 0315 in FIG. 7, any other service level objective item than described above is also acceptable. In this case, information of an excess and shortage ratio corresponding to an added service level objective is managed in service level objective excess and shortage ratio information 0316.

Up to this point, a description has been given to varied information handled by the management system 0110 in the present embodiment.

The above description covers information used in control in the present embodiment and information often provided in an ordinary management system 0110. However, new information may be added to management information 0310 as required and unnecessary information, if any, may be deleted.

Hereafter, a detailed description will be given to varied processing in the management system 0110 roughly described with reference to Steps S1 to S7 in FIG. 1.

The following description is limited to processing that should be provided at minimum to implement the essence of the present invention and with respect to portions that are not important for the implementation are considered to have been appropriately provided and a description thereof is omitted. Further, for example, the following processing is omitted from the following description: processing of accepting data read/write from a host 0130 to a volume in a storage apparatus 0120, replication processing of journal-based system or snapshot-based system itself, processing of accepting various instructions from a management system 0110, processing performed when any failure occurs in varied processing or component, and the like. Any arbitrary processing may be added as required during execution of varied processing.

Description of Operation of Management System 0110

A description will be given to the operation of the management system 0110.

FIG. 10 is a drawing illustrating a flow of processing in which the remote copy construction unit 0321 of the management system 0110 constructs a remote copy in accordance with a request from a user 0140 of a storage apparatus 0120, shown in Steps S1 to S3 in FIG. 1.

Steps S0100 to S0103 are performed by the remote copy construction unit 0321 residing in the control program 0320 of the management system 0110. The present processing is launched when a user 0140 of a storage apparatus 0120 instructs the management system 0110 to construct a remote copy.

In the present processing, first, the user 0140 of the storage apparatus 0120 requests the management system 0110 to construct a new remote copy and the remote copy construction unit 0321 of the management system 0110 receives the request (S0100).

This request contains: a replication system used in the remote copy constructed; respective information of the replication source storage apparatus 0120, volume PVOL 0121, and master journal area MJNL 0122, respective information of a replication destination storage apparatus 0120, volume SVOL 0125, and restore journal area RJNL 0124, information of a service level objective, and the like. This request may additionally contain arbitrary information, such as information for the management system 0110 to identify the user 0140.

Instead of receiving information of the replication destination storage apparatus 0120 from the user 0140, the remote copy construction unit 0321 may receive a requirement, such as a physical distance, related to the replication destination. In this case, the remote copy construction unit 0321 automatically selects a replication destination storage apparatus 0120 that meets the requirement based on storage apparatus information 0311 and the like.

Further, the remote copy construction unit 0321 may reference to management information 0310, such as remote copy configuration information 0312 and remote copy performance information 0315, and select a replication destination storage apparatus 0120 where a violation of a service level objective is less prone to occur. Specifically, such a method that a storage apparatus 0120 where a remote copy large in lower-limit IO amount 0700 of service level objective information 0314 has been already present is avoided is possible.

Subsequently, the remote copy construction unit 0321 groups remote copies involving a bottleneck part causing degradation in RPO in common, using the received information and remote copy configuration information 0312 (S0101).

Though a method for this grouping is arbitrary, one of the simplest methods is that remote copies identical in set of replication source and replication destination storage apparatuses 0120 are handled as one group. In the example in FIG. 1, remote copies from the storage apparatus 0120A to the storage apparatus 0120B are placed into an identical group. Remote copies from the storage apparatus 0120A to the storage apparatus 0120C are placed into an identical group. Meanwhile, remote copies from the storage apparatus 0120A to the storage apparatus 0120B or remote copies from the storage apparatus 0120A to the storage apparatus 0120C are not placed into an identical group but placed into different groups. A method in which remote copies for which either of replication source and replication destination storage apparatuses 0120 are identical are handled as one group may also be acceptable. In this case, it can also be described that a plurality of remote copies for which at least either of storage apparatuses where a replication source volume is disposed and storage apparatuses where a replication destination volume is disposed are common are grouped.

Examples of more advanced possible methods include: a method in which even though identical in set of replication source and replication destination storage apparatuses 0120, remote copies different in communication port 0204 used are handled as different groups; a method in which network connections actually utilized in a management system 0110 are managed and remote copies different in line are handled as different groups; a method in which information related to some shared resource (for example, CPU 0201 and memory 0202) used by a storage apparatus 0120 for replication processing in a management system 0110 is managed and remote copies are grouped according to a sharing range of the resource; and the like. In this case, it can also be described that the remote copy construction unit 0321 groups a plurality of remote copies and the grouping is performed, for example, based on whether resources used to make a remote copy are common in at least either of a replication source volume and a replication destination volume. As a result, remote copies prone to have influence on each other can be more easily determined.

In the present embodiment, this grouping processing is performed only when a new remote copy is constructed but the grouping may be periodically reviewed to accommodate change in bottleneck part.

Subsequently, the remote copy construction unit 0321 adds a new entry to management information 0310 based on the received information and a result of grouping performed at the previous step (S0102).

Specifically, the remote copy construction unit 0321 adds a new entry to remote copy configuration information 0312, service level objective information 0314, and throttling setting information 0313. Further, with respect to throttling setting information 0313, the remote copy construction unit 0321 considers nothing to have been set for throttling and registers information.

Subsequently, the remote copy construction unit 0321 instructs the replication source and replication destination storage apparatuses 0120 to construct a remote copy (S0103).

This constructing instruction is implemented by the remote copy construction unit 0321 and each storage apparatus 0120 conducting some communication through the communication ports 0204.

At each storage apparatus 0120, a remote copy is constructed in accordance with the instruction but the details thereof are omitted.

FIG. 11 is a drawing illustrating a flow of processing in which the apparatus monitoring unit 0322 of the management system 0110 monitors each storage apparatus 0120, shown in Steps S4 to S5 in FIG. 1.

This processing is periodically launched and performed at the management system 0110.

In the present processing, first, the apparatus monitoring unit 0322 references to storage apparatus information 0311 and acquires a list of storage apparatuses 0120 as the targets of information acquisition (S0201).

Subsequently, the apparatus monitoring unit 0322 references to remote copy configuration information 0312 and acquires a list of remote copies as the targets of information acquisition (S0202).

Subsequently, the apparatus monitoring unit 0322 acquires information about each remote copy acquired at Step S0202 from each storage apparatus 0120 acquired at Step S0201 (S0203).

This information acquisition is implemented by the apparatus monitoring unit 0322 and each storage apparatus 0120 conducting some communication through the communication ports 0204.

Finally, the apparatus monitoring unit 0322 updates remote copy performance information 0315 using the acquired information (S0204).

At this time, the apparatus monitoring unit 0322 may arbitrarily process the collected information. For example, conversion from a data format used inside a storage apparatus 0120 to a data format used in the management system 0110, unit conversion, and the like can be performed.

Further, the apparatus monitoring unit 0322 may consolidate information acquired from both replication source and replication destination storage apparatuses 0120 to generate one piece of information. For example, replication delay 0802 of journal-based system may be sometimes computed using a difference between time when data is written to the replication source volume PVOL 0121 of a replication source storage apparatus 0120 to generate a log and time when the log is transferred to a replication destination storage apparatus 0120 and reflected in the replication destination volume SVOL 0125.

Figure 12:
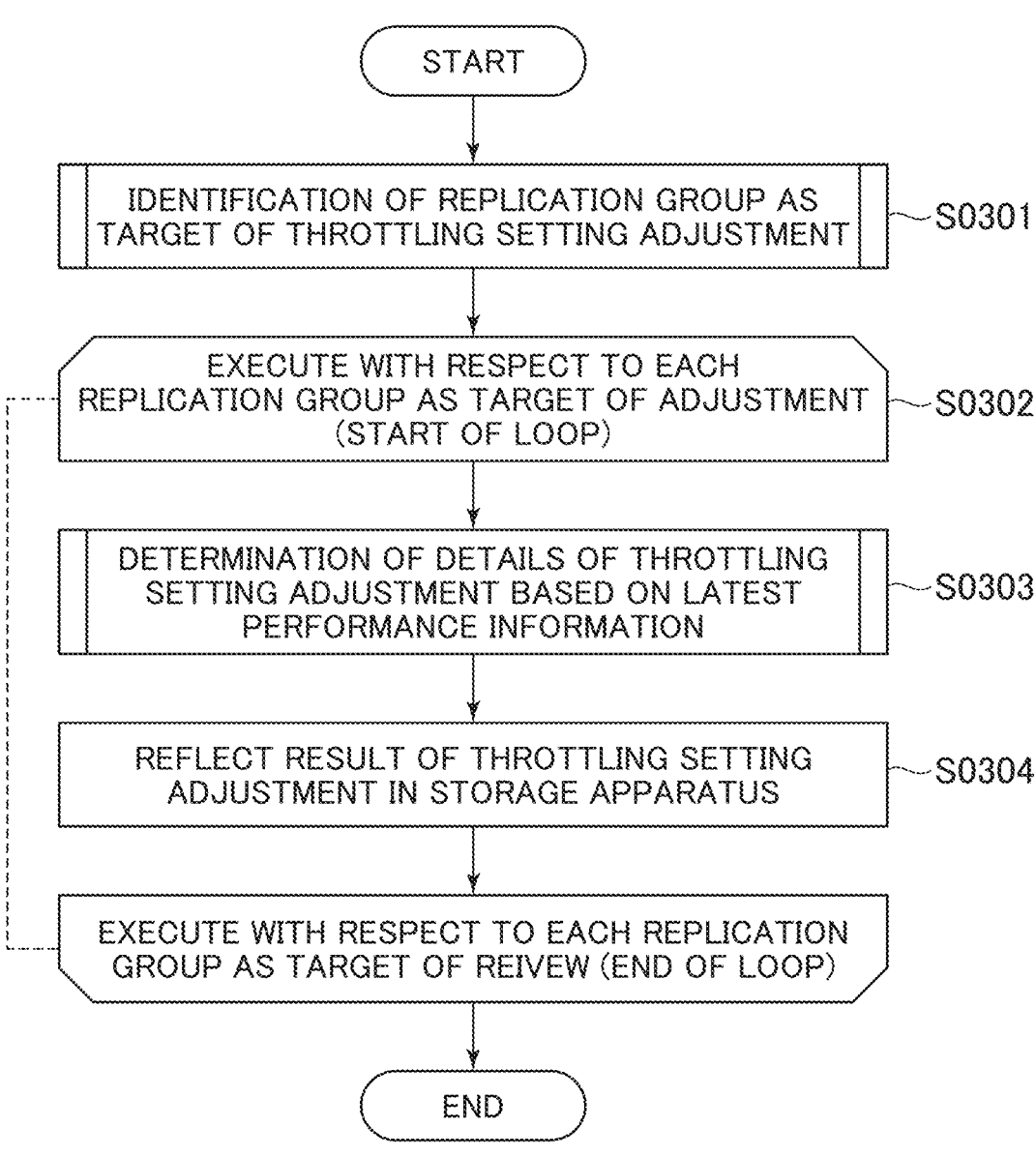
FIG. 12 is a drawing illustrating a flow of processing for a service level guarantee unit of a management system to adjust the operation of replication processing at each storage apparatus to guarantee a service level objective set for each remote copy, shown at Steps S6 to S7 in FIG. 1.

FIG. 12 is a drawing illustrating a flow of processing in which the service level guarantee unit 0323 of the management system 0110 adjusts the operation of replication processing at each storage apparatus 0120 to guarantee a service level objective set for each remote copy, shown in Steps S6 to S7 in FIG. 1.

This processing is periodically launched and performed at the management system 0110.

In the present processing, first, the service level guarantee unit 0323 performs processing for extracting a replication group for which throttling setting must be adjusted (S0301). This processing will be described later with reference to FIG. 13.

Thereafter, the adjustment processing of Steps S0303 to S0304 is sequentially performed with respect to each extracted replication group (S0302). In this case, it can also be described that the service level guarantee unit 0323 selects other remote copies for which an amount of transferred data is limited from the same group as a remote copy related to replication delay time based on a result of the grouping. As a result, an amount of transferred data can be adjusted between remote copies prone to have influence on each other.

At Step S0303, the service level guarantee unit 0323 determines the details of throttling setting adjustment using the latest remote copy performance information 0315 collected by the apparatus monitoring unit 0322. This processing will be described later with reference to FIG. 14.

At Step S0304, thereafter, the service level guarantee unit 0323 sets the throttling setting adjusted at the previous step for each storage apparatus 0120.

The setting processing is implemented by the apparatus monitoring unit 0322 and each storage apparatus 0120 conducting some communication through the communication ports 0204.

Though not shown in the drawings, each storage apparatus 0120 has a function for implementing throttling setting instructed by the service level guarantee unit 0323 of the management system 0110 and this function is used to perform throttling. For example, in general, many storage apparatuses 0120 have a Quality-of-Service function to limit an IO amount accepted from a host 0130 and use of this function enables throttling of host IO limitation 0600 to be easily implemented.

Aside from the foregoing, inter-apparatus transfer speed limitation 0601 and initial copy operation limitation 0602 limit remote copy processing itself and can be implemented by reducing an execution period or concurrency of log transfer processing within a storage apparatus 0120.

Figure 13:
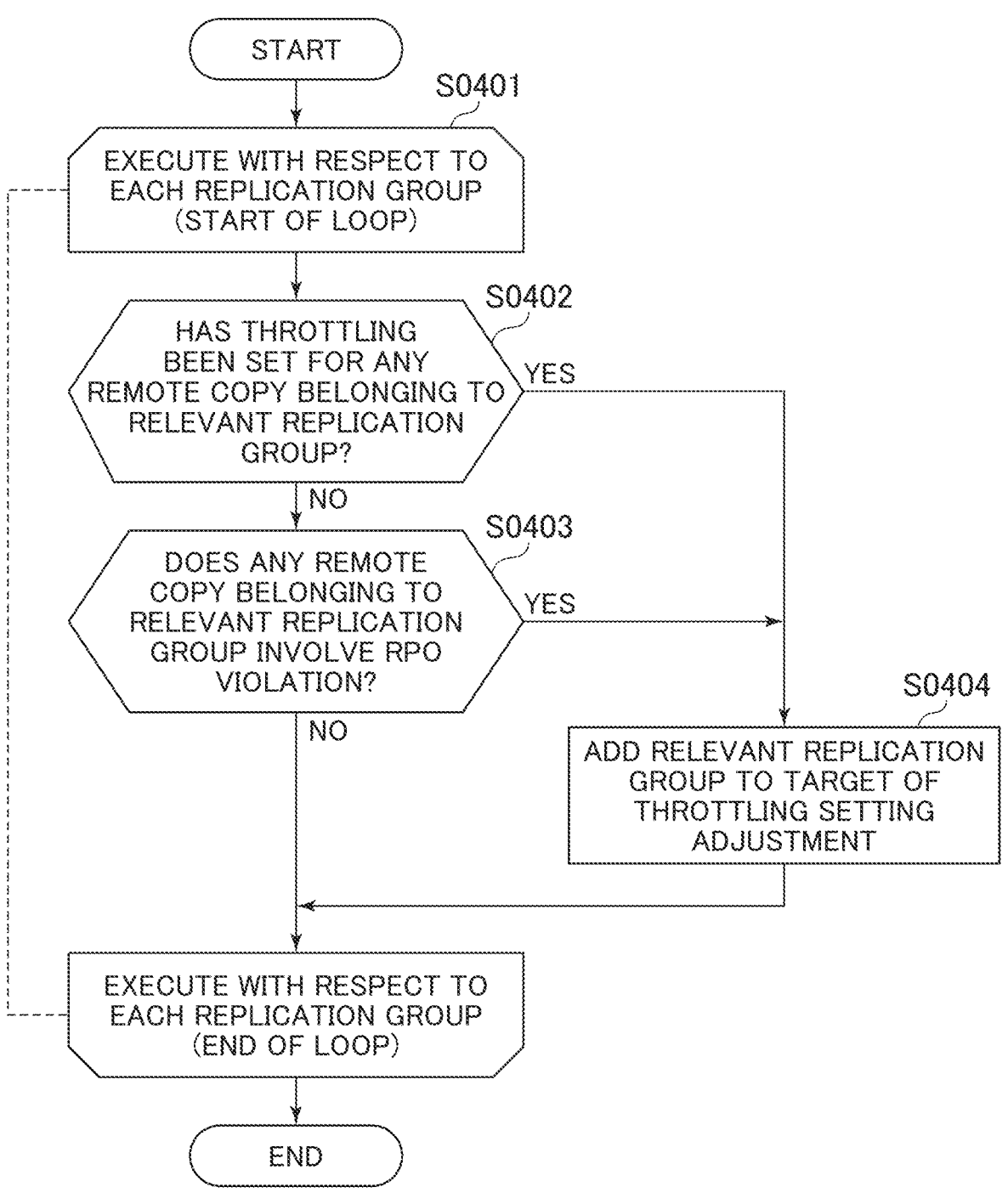
FIG. 13 is a drawing illustrating a flow of processing for specifying a replication group as a target of adjustment of throttling setting at a service level guarantee unit.

FIG. 13 is a drawing illustrating a flow of processing for identifying a replication group as a target of throttling setting adjustment in the service level guarantee unit 0323.

This processing is processing (subroutine) performed at Step S0301 in FIG. 12.

In this processing, a replication group containing a remote copy for which some throttling is set and a replication group containing a remote copy in which an RPO violation has occurred are taken as targets requiring throttling setting adjustment and a response is made to a caller unit. The reason for the former is that an adjustment including cancellation of already set throttling is required and the reason for the latter is that an adjustment to intensify throttling for improvement of the RPO violation is required.

In this processing, with respect to each replication group defined in remote copy configuration information 0312, the service level guarantee unit 0323 sequentially performs the processing of Steps S0402 to S0404 (S0401).

At Step S0402, first, the service level guarantee unit 0323 references to throttling setting information 0313 and determines whether some throttling is set for any remote copy belonging to the relevant replication group.

As a result, when any setting has not been made (No at Step S0402), the processing proceeds to S0403 and when setting has been made (Yes at Step S0402), the processing proceeds to Step S0404.

At Step S0403, subsequently, the service level guarantee unit 0323 references to remote copy performance information 0315 and service level objective information 0314 and determines whether an RPO violation (replication delay 0802>RPO 0701) has occurred in any remote copy belonging to the relevant replication group.

As a result, when a violation has occurred (Yes at Step S0403), the processing proceeds to S0404 and when a violation has not occurred (No at Step S0403), the processing for the relevant replication group is terminated and the processing proceeds to processing for the next replication group.

Here, those where an RPO violation has actually occurred are added to the targets of adjustment for the purpose of simplification; however, in this method, a service level objective requested by a user 0140 is not attained during a period before an adjustment is appropriately made. To prevent this, for example, information of replication delay 0802 may be chronologically managed in remote copy performance information 0315; future replication delay 0802 is inferred by making a regression analysis or the like; and with respect to those determined to involve an RPO violation in the future, throttling may be adjusted in advance. In this case, the service level guarantee unit 0323 adjusts throttling not when a replication delay time of a remote copy exceeds a service level objective but when a replication delay time of a remote copy is likely to exceed a service level objective.

At Step S0404, the service level guarantee unit 0323 determines that the relevant replication group is a target of throttling setting adjustment and adds the relevant replication group to a list of targets of adjustment responded to the caller unit.

Figure 14:
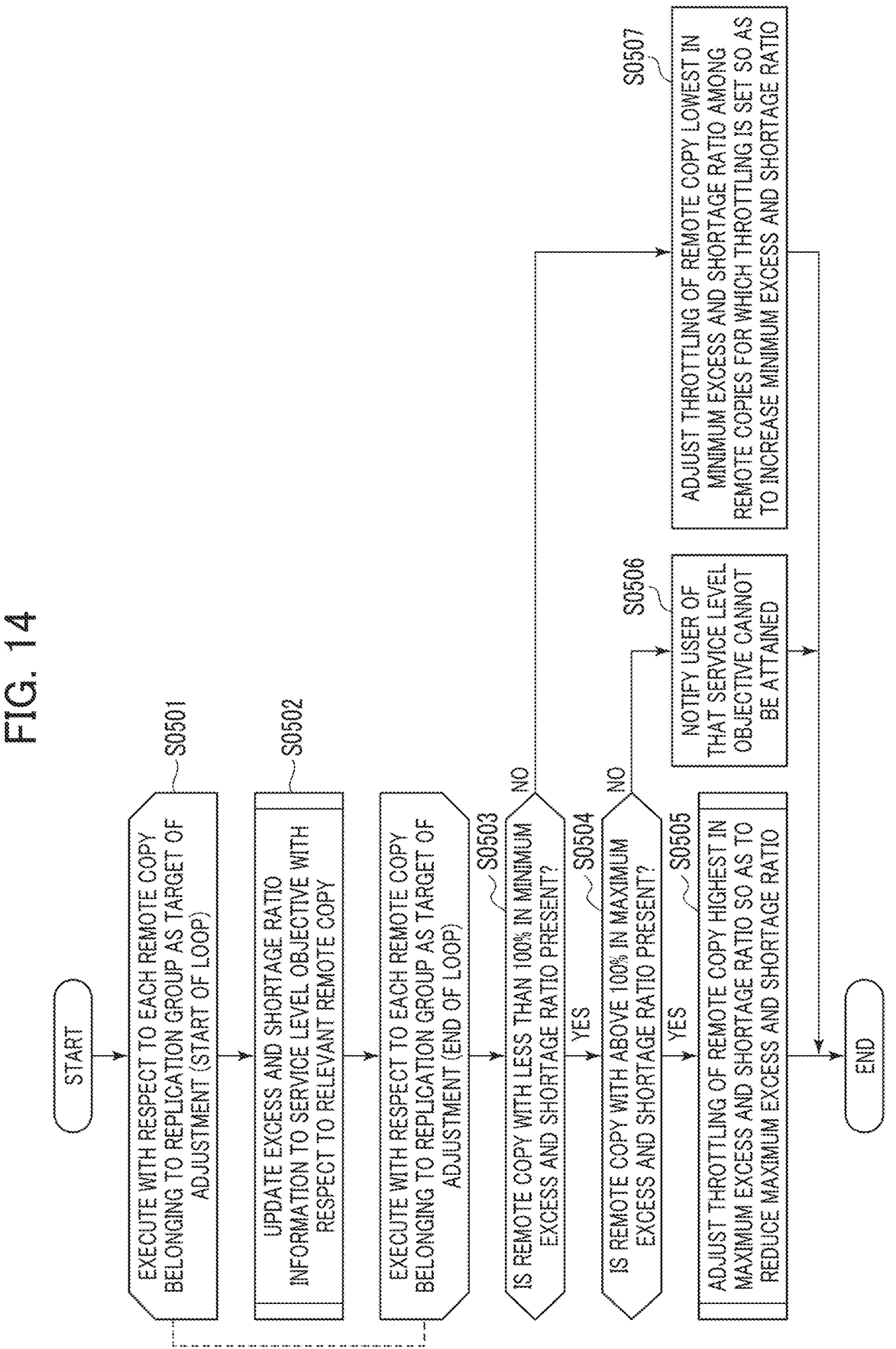
FIG. 14 is a drawing illustrating a flow of processing for determining the details of adjustment of throttling setting at a service level guarantee unit.

FIG. 14 is a drawing illustrating a flow of processing for determining the details of throttling setting adjustment at the service level guarantee unit 0323.

This processing is processing (subroutine) performed at Step S0303 in FIG. 12.

In this processing, first, the service level guarantee unit 0323 sequentially performs the processing of Step S0502 with respect to each remote copy belonging to a replication group as the target of adjustment (S0501).

At Step S0502, the service level guarantee unit 0323 updates service level objective excess and shortage ratio information 0316 with respect to each remote copy belonging to a replication group as the target of adjustment. This computation processing will be described later with reference to FIG. 15.

In the excess and shortage ratio computed here, 100% means a situation in which a service level objective is just attained; less than 100% means a situation in which an objective is violated; above 100% means a situation in which a margin is present to attain an objective.

Subsequently, with respect to the computed excess and shortage ratio of each remote copy, the service level guarantee unit 0323 determines whether a remote copy with less than 100% in minimum excess and shortage ratio 0903 is present (S0503).

As a result, when a remote copy with less than 100% is present (Yes at Step S0503), the processing proceeds to Step S0504 and when not (all the remote copies are above 100% in excess and shortage ratio) (No at Step S0503), the processing proceeds to Step S0507.

At Step S0504, the service level guarantee unit 0323 determines whether a remote copy with above 100% in computed maximum excess and shortage ratio 0902 is present.

As a result, when a remote copy with above 100% is present (Yes at Step S0504), the processing proceeds to Step S0505 and when a remote copy with above 100% is not present (No at Step S0504), the processing proceeds to Step S0506.

At Step S0505, the service level guarantee unit 0323 adjusts the throttling setting of a remote copy highest in maximum excess and shortage ratio 0902 and highest in margin to attain an objective so that the maximum excess and shortage ratio 0902 is reduced. The details of this processing will be described later with reference to FIG. 16.

This adjustment means that a resource (communication band between storage apparatuses 0120 or the like) consumed by a remote copy having a highest margin to attain a service level objective is allocated to remote copies involving a violation of a service level objective; as a result, the remote copies are equalized in excess and shortage ratio. In this case, the service level guarantee unit 0323 limits an amount of transferred data of remote copy so that a plurality of remote copies in an identical group are substantially equal in the degree of attainment of an objective value of replication delay time. In this case, a degree of attainment of an objective value of replication delay time can be expressed by IO amount excess and shortage ratio 0900 and RPO excess and shortage ratio 0901. Therefore, the service level guarantee unit 0323 limits an amount of transferred data of remote copy so that IO amount excess and shortage ratio 0900 and RPO excess and shortage ratio 0901 become substantially equal. As a result, remote copy can be more stably operated.

Consequently, elimination or improvement of a violation of a service level objective is expected.

At S0506, the service level guarantee unit 0323 notifies the user 0140 of the storage apparatus 0120 of that in the present situation, a service level objective cannot be attained and prompts the user 0140's intervention.

This is because a remote copy with above 100% in maximum excess and shortage ratio 0902 is not present and if the throttling is made stricter, a violation of another service level objective will be incurred.

As described in relation to the remote copy performance information 0315 in FIG. 7, service level objective information 0314 and service level objective excess and shortage ratio information 0316 may be so configured sometimes that a remaining time (error budget) for which a violation of a service level objective is permitted is managed. In this case, one possible option is that at Step S0506, the service level guarantee unit 0323 intentionally sets such throttling as to violate a service level objective with respect to a remote coy having a margin in error budget. Then, the service level guarantee unit 0323 changes remote copies as targets of intentional violation of service level objective so that the error budgets of all the remote copies are equally used up; and depletion of error budget can be postponed and a situation in which a user 0140's intervention is required can be reduced.

At Step S0507, the service level guarantee unit 0323 adjusts throttling setting so as to increase minimum excess and shortage ratio 0903 with respect to a remote copy lowest in excess and shortage ratio 903 and lowest in margin to attain an objective among the remote copies for which throttling is set.

With respect to throttling setting made due to a past violation of a service level objective, the violation is eliminated at present; therefore, this processing is intended to sequentially cancel throttling from one strict in throttling setting and having a low margin to attain an objective.

Examples of methods for canceling throttling include: a method in which limitation is simply released and an unlimited state is established; and a method in which throttling is gradually loosened at a fixed rate every cycle of execution of a flow of the service level guarantee processing (Refer to FIG. 12) and this operation is repeated to gradually establish an unlimited state.

Or, a more advanced technique may be adopted. An example of a more advanced technique is a method in which the service level guarantee unit 0323 repeatedly loosens throttling so that the throttling setting becomes equal to that having the second lowest excess and shortage ratio (identical ratio excluded) to gradually bring close to an unlimited state. Another example of a possible method is that the service level guarantee unit 0323 estimates an amount of processing of remote copies that can be presently utilized without a violation of a service level objective based on remote copy performance information 0315 and the like and loosens throttling by an amount equivalent to the excess.

Figure 15:
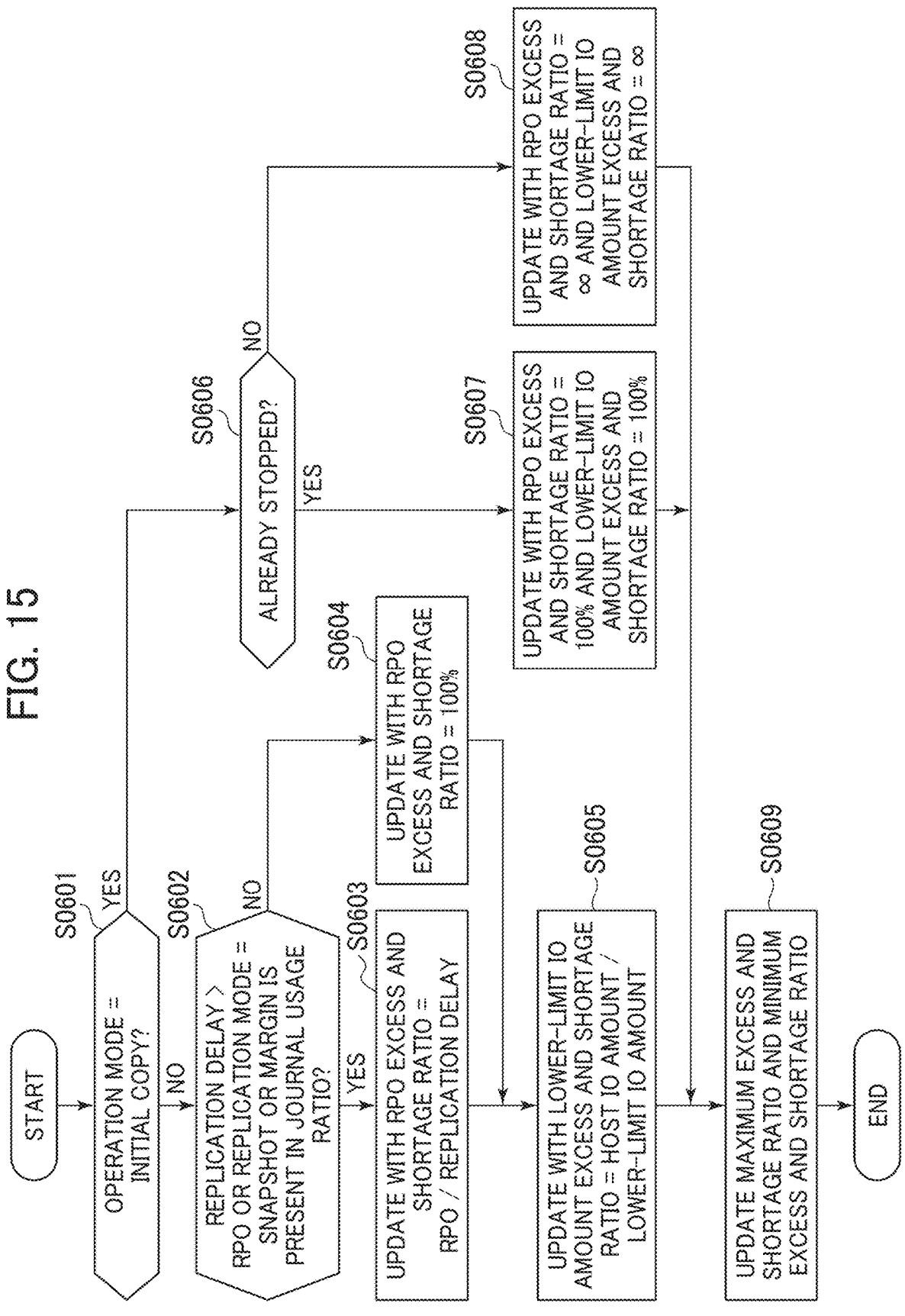
FIG. 15 is a drawing illustrating a flow of processing for computing an excess and shortage ratio to a service level objective of a remote copy at a service level guarantee unit.

FIG. 15 is a drawing illustrating a flow of processing for computing an excess and shortage ratio relative to a service level objective of a remote copy at the service level guarantee unit 0323.

This processing is processing (subroutine) performed at Step S0502 in FIG. 14. Utilization of excess and shortage ratio enables a remote copy that most lacks in a service level objective, which is required performance, to be more easily determined.

In this processing, first, the service level guarantee unit 0323 references to remote copy performance information 0315 with respect to a remote copy to be processed and determines whether the operation status 0800 thereof is "initial copy" (S0601).

As a result, when the operation status 0800 is "initial copy" (Yes at Step S0601), the processing proceeds to Step S0606, and when not (No at Step S0601), the processing proceeds to Step S0602.

At Step S0602, with respect to the relevant remote copy, the service level guarantee unit 0323 determines whether any of the following conditions is satisfied: replication delay 0802 is greater than RPO 0701, or replication mode 0502 is snapshot-based system, or a predetermined margin is present in journal usage ratio 0803.

As a result, when any of these conditions is satisfied (Yes at Step S0602), the processing proceeds to Step S0603 and when none is satisfied (No at Step S0602), the processing proceeds to Step S0604.

At Step S0606, the service level guarantee unit 0323 determines whether the initial copy operation limitation 0602 of the relevant remote copy is "stopped."

As a result, when the initial copy operation limitation is "stopped" (Yes at Step S0606), the processing proceeds to Step S0607 and when not (No at Step S0606), the processing proceeds to Step S0608.

At Step S0603, with respect to the relevant remote copy, the service level guarantee unit 0323 takes that RPO excess and shortage ratio 0901=RPO 0701/replication delay 0802 and updates service level objective excess and shortage ratio information 0316 and thereafter, proceeds to Step S0605.

At Step S0604, with respect to the relevant remote copy, the service level guarantee unit 0323 takes a fixed value of RPO excess and shortage ratio 0901=100% and updates service level objective excess and shortage ratio information 0316 and thereafter, proceeds to Step S0605.

In other words, a condition for proceeding to S0604 at a conditional branch of Step S0602 means a state in which replication delay 0802 is smaller than RPO 0701, and replication mode 0502 is journal-based system, and a predetermined margin is not present in journal usage ratio 0803.

Since replication delay 0802 is smaller than RPO 0701, RPO excess and shortage ratio 0901 essentially becomes higher than 100% according to computation at Step S0603. However, since no margin is present in journal usage ratio and RPO excess and shortage ratio 0901 is reduced, no margin is present to perform such throttling as to limit a transfer speed of a log between storage apparatuses 0120 in journal-based system. For this reason, RPO excess and shortage ratio 0901 is taken as a fixed value of 100% and the relevant remote copy is thereby prevented to be selected as a target of throttling in future processing.

In this case, it can be described that, when with respect to a remote copy, including those of journal-based system, a journal usage ratio, which is a usage ratio of a journal area utilized to make the remote copy, does not satisfy a predetermined range, the service level guarantee unit 0323 does not include this remote copy in other remote copies for which an amount of transferred data is limited. As a result, even when a remote copy is of journal-based system, the remote copy can be stably operated.

At Step S0605, with respect to the relevant remote copy, the service level guarantee unit 0323 takes lower-limit IO amount excess and shortage ratio 0900=host IO amount 0801/lower-limit IO amount 0700 and updates service level objective excess and shortage ratio information 0316, and thereafter, proceeds to Step S0609.

At Step S0607, with respect to the relevant remote copy, the service level guarantee unit 0323 takes both RPO excess and shortage ratio 0901 and lower-limit IO amount excess and shortage ratio 0900 as a fixed value of 100% and updates the ratios, and thereafter, proceeds to Step S0609.

At Step S0608, with respect to the relevant remote copy, the service level guarantee unit 0323 takes both RPO excess and shortage ratio 0901 and lower-limit IO amount excess and shortage ratio 0900 as a fixed value of (infinity) and updates the ratios, and thereafter, proceeds to Step S0609.

In the present embodiment, a service level objective is not present with respect to initial copy; therefore, in a situation in which an initial copy is in operation (Step S0608), ∞ is taken as excess and shortage ratio so that the relevant remote copy is selected at top priority as a target of throttling. Instead of taking ∞ as excess and shortage ratio, the service level guarantee unit 0323 may take such a large value that is actually impossible.

In this case, it can be described that the service level guarantee unit 0323 does not include a remote copy whose operation status is initial copy into remote copies for which a journal usage ratio is to be determined. That is, even when a remote copy is of journal-based system and a journal area is insufficient, a remote copy is selected at top priority as a target of throttling as long as the remote copy is in initial copy. As a result, a resource related to initial copy requiring much time can be preferentially allocated to other remote copies.

With respect to this mode, it can be described that the service level guarantee unit 0323 selects other remote copies for which transfer is limited with a journal usage ratio of a remote copy of journal-based system taken into account.

At Step S0609, of the RPO excess and shortage ratio 0901 and lower-limit IO amount excess and shortage ratio 0900 computed up to this step, the smaller one is taken as minimum excess and shortage ratio 0903. Then, the larger one is taken as maximum excess and shortage ratio 0902 and service level objective excess and shortage ratio information 0316 is updated.

Figure 16:
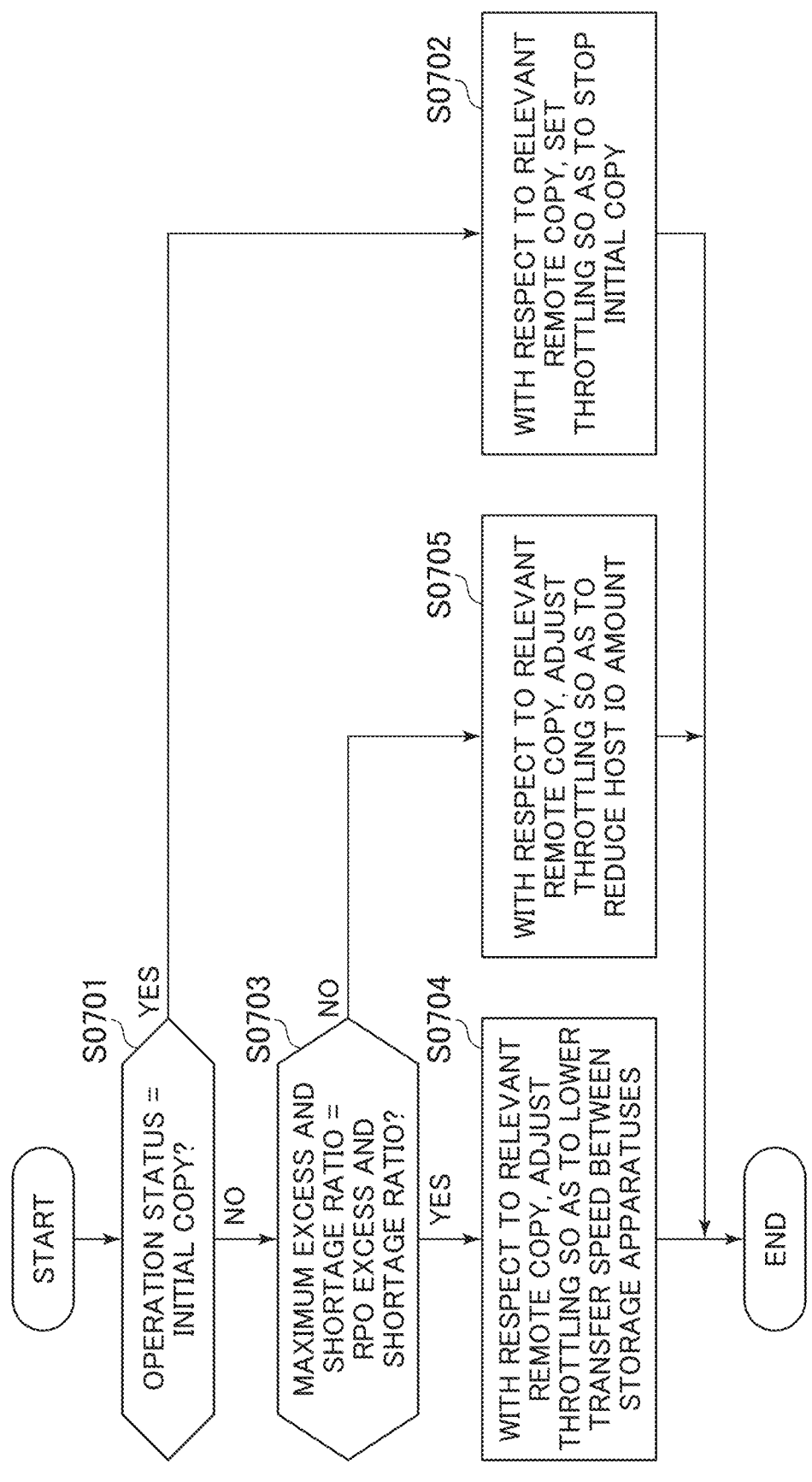
FIG. 16 is a drawing illustrating an example of throttling adjustment processing at a service level guarantee unit.

FIG. 16 is a drawing illustrating an example of throttling adjustment processing at the service level guarantee unit 0323.

This processing is processing (subroutine) performed at Step S0505 in FIG. 14.

In the present processing, first, with respect to a remote copy as the target of throttling, the service level guarantee unit 0323 determines whether operation status 0800 is "initial copy" (Step S0701).

As a result, when operation status 0800 is "initial copy" (Yes at Step S0701), the processing proceeds to Step S0702 and when not (No at Step S0701), the processing proceeds to Step S0703.

At Step S0702, the service level guarantee unit 0323 updates throttling setting information 0313 so as to stop the initial copy in operation in the relevant remote copy. As a result, a resource related to initial copy requiring much time can be allocated to other remote copies whose replication delay 0802 does not satisfy RPO 0701. As a result, a replication delay time can be recovered.

At Step S0703, the service level guarantee unit 0323 determines whether an excess and shortage ratio that is maximum excess and shortage ratio 0902 is equal to RPO excess and shortage ratio 0901.

As a result, when maximum excess and shortage ratio 0902=RPO excess and shortage ratio 0901 (Yes at Step S0703), the processing proceeds to Step S0704 and when not (No at Step S0703), the processing proceeds to S0705.

At Step S0704, with respect to the relevant remote copy, the service level guarantee unit 0323 so adjusts throttling as to reduce a transfer speed between storage apparatuses 0120 and updates throttling setting information 0313. As a result, a replication delay time can be recovered.

At Step S0705, with respect to the relevant remote copy, the service level guarantee unit 0323 so adjusts throttling as to reduce host IO amount 0801 and updates throttling setting information 0313. By limiting an accepted amount of IO issued by a host, an amount of transferred data from a replication source volume to a replication destination volume is reduced. As a result, a transfer speed from the replication source volume to the replication destination volume can be indirectly limited and thus, a replication delay time can be recovered.

In the above method, it can be described that the service level guarantee unit 0323 limits an amount of transferred data of other remote copies having influence on remote copy so that a remote copy satisfies a replication delay time in objective information.

Specifically, when a plurality of other remote copies become a candidate of an amount of transferred data limit objective, the service level guarantee unit 0323 stops other remote copies whose operation status is initial copy.

Further, when any other remote copy whose operation status is initial copy is not present and a plurality of other remote copies become a candidate of an amount of transferred data limit objective, the service level guarantee unit 0323 determines other remote copies subjected to transfer limit based on a difference between the performance information of the other remote copies and the objective information thereof.

Then, when most insufficient performance required is a degree of a replication delay time, based on the difference, the service level guarantee unit 0323 limits a transfer speed from a replication source volume to a replication destination volume. In this case, it can be described that the service level guarantee unit 0323 limits data write to a replication source volume related to other remote copies and thereby limits an amount of transferred data of the other remote copies. As a result, an amount of transferred data of other remote copies is reduced and a replication delay time of a remote copy to be improved is improved. Further, due to the foregoing, an amount of transferred data of a remote copy to be improved is reduced and thus, a replication delay time of the remote copy to be improved is improved.

Further, when most insufficient performance required is a transferred speed from a replication source volume to a replication destination volume, based on this difference, the service level guarantee unit 0323 limits an accepted amount of IO issued by a host. In this case, it can be described that the service level guarantee unit 0323 limits an amount of transferred data of other remote copies based on a write amount and a replication delay time in objective information.

As mentioned above, the service level guarantee unit 0323 limits data write to a replication source volume related to a remote copy based on a write amount and a replication delay time in objective information and thereby improves a replication delay time of the remote copy.

Further, it can be described that the service level guarantee unit 0323 determines other remote copies for which an amount of transferred data is to be limited based on an excess and shortage ratio that is a value obtained by dividing the current performance by required performance.

Both at Step S0704 and at Step S0705, an adjustment is so made as to reduce an excess and shortage ratio by making throttling strict; however, with respect to an amount of adjustment within one execution cycle of a service level guarantee processing flow (Refer to FIG. 12), a method in which throttling is made strict simply by a predetermined fixed amount or at a fixed ratio may be used or a more advanced technique may be used. An example of a more advanced technique is a method in which the throttling is made strict so that the throttling setting becomes equal to that having the second lowest excess and shortage ratio (identical ratio excluded) and this operation is repeated to gradually make strict.

Another example of a possible method is that an amount of processing of remote copy that is presently available without a violation of a service level objective is estimated based on remote copy performance information 0315 or the like and then, throttling is made strict by an amount equivalent to the shortage.

Figure 17:
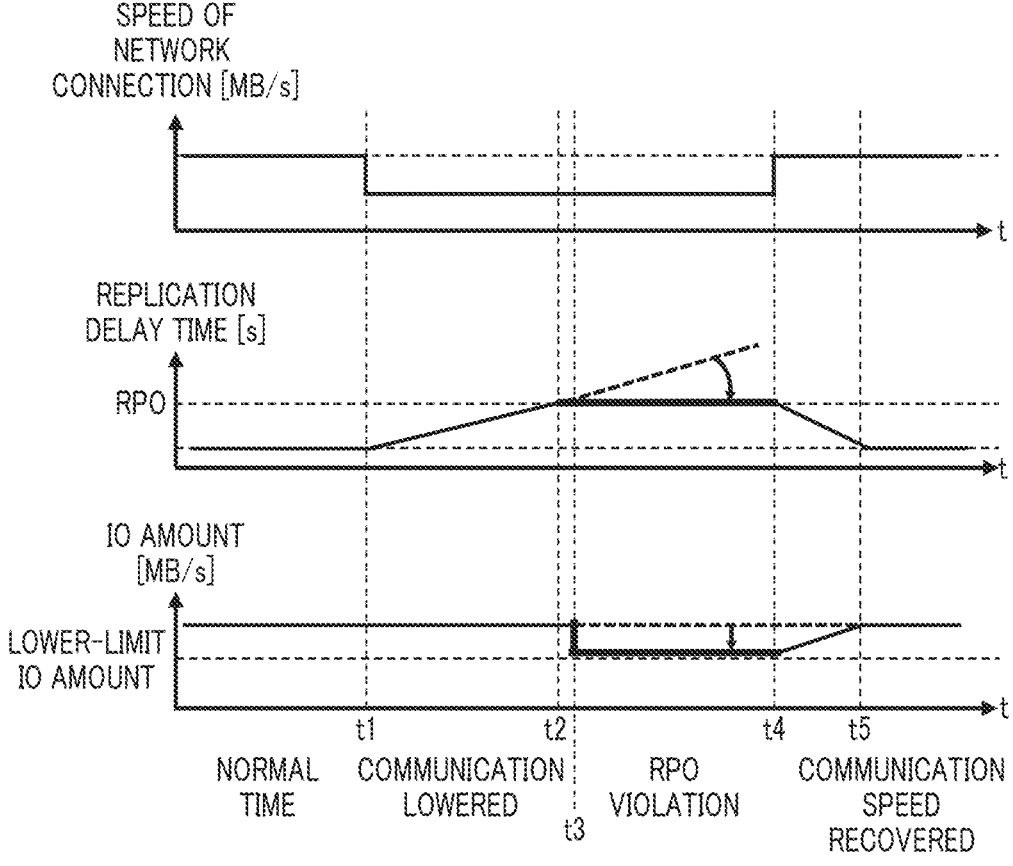
FIG. 17 is a drawing showing an example of variation in replication delay time observed when a remote copy is managed by a management system in the present embodiment.

FIG. 17 is a drawing showing an example of variation in replication delay time observed when remote copy is managed by a management system 0110 in the present embodiment.

In FIG. 17, the horizontal axes indicate time and show variation in a speed of a network connection, a replication delay time, and an IO amount issued by a host 0130 with time.

In FIG. 17, a period until time t1 is normal time and the drawing indicates that a speed of the network connection is ensured. The drawing shows that at this time, the replication delay time is smaller than RPO and the IO amount is larger than the lower-limit IO amount.

The drawing indicates that at time t1, the speed of the network connection is lowered because of congestion or the like. The drawing indicates that as the result of reduction in the speed of network connection, the replication delay time is increased between time t1 and time t2.

The drawing indicates that at time t2, the replication delay time reaches RPO.

The management system 0110 detects this. At time t3, the management system 0110 reduces the IO amount within a range which the lower-limit IO amount is satisfied. As a result, the replication delay time maintains RPO.

The drawing indicates that at time t4, thereafter, the speed of the network connection is recovered. According thereto, after time t4, the replication delay time is reduced. According to the recovery of replication delay time, the management system 0110 gradually returns the IO amount to that at the original transfer speed.

During a period from time t3 to time t4, an RPO violation takes place and the replication delay time does not satisfy required performance unless the IO amount is limited; therefore, the management system 0110 reduces the IO amount to avoid this.

At time t5, the replication delay time returns to the original level attained before time t1. At time t5, the management system 0110 returns the IO amount to that at the original transfer speed before time t1.

Description of Effects

The management system 0110 in the present embodiment manages replication source and replication destination storage apparatuses 0120. A user who utilizes remote copy registers a write data amount and a service level objective related to RPO for each remote copy as required performance with the management system 0110. Then, the management system 0110 allocates a resource (communication band between storage apparatuses 0120 or the like) of a remote copy having a margin in required performance among a plurality of remote copies to remote copies involving a violation of service level objective. In this case, as a result, a service level objective as required performance can be satisfied and further, remote copy can be operated. Further, even in an environment in which a connection speed and an amount of data written from a host 0130 are uncertain, remote copy can be stably operated.

Description of Management Method

As shown in FIG. 2, the processing performed by the management system 0110 is implemented by software and hardware resources cooperating with each other.

Therefore, the processing performed by the above-mentioned management system 0110 can be understood as a management method in which a management apparatus including a processor manages a plurality of storage apparatuses communicating with one another via a network and having a respective volume; in this management method, a remote copy transferred from a replication source volume of a plurality of volumes to a replication destination volume via the network and duplicated is set for a combination of a plurality of replication source volumes and replication destination volumes; and the management apparatus monitors a replication delay time, which is a time required for duplicating a remote copy, and exercises control to limit an amount of transferred data of the other remote copies based on the replication delay time.

A program that implements the present embodiment is provided by a means of communication, needless to add, but can also be provided as is stored in such a recording medium as CD-ROM.

Up to this point, a description has been given to a major embodiment of the present invention but this is an example for explaining the present invention and is not intended to limit the scope of the present invention only to this embodiment.

The present invention need not be provided with all the described configuration elements and some configuration element of an embodiment may be replaced with a configuration element of another embodiment or may be added thereto. Similarly, some configuration element of each embodiment can also be modified or deleted as required.

What is claimed is:

1. A management apparatus that includes a processor and manages a plurality of storage apparatuses communicating with one another via a network and having a respective volume, wherein a remote copy transferred from a replication source volume of a plurality of the volumes to a replication destination volume via the network and duplicated is set for a combination of a plurality of replication source volumes and replication destination volumes, the remote copy exists in plurality and a plurality of the remote copies are set from the storage apparatus having a plurality of the replication source volumes to the storage apparatus having a plurality of the replication destination volumes, objective information that is a performance objective of the remote copy and contains an objective value of a replication delay time is set to each of the plurality of remote copies, and the processor:

monitors the replication delay time, which is a time required for the replication of the remote copy; and exercises control to limit an amount of transferred data of other remote copies, which have an influence on one of the remote copies, based on the replication delay time in order to improve the replication delay time of the one of the remote copies so as to satisfy the performance objective.

2. The management apparatus according to claim 1, wherein the replication source volume accepts a write request and stores data and the data stored in the replication source volume is duplicated in the replication destination volume by the remote copy, and the processor limits data write to a replication source volume related to the other remote copies and thereby limits an amount of transferred data of the other remote copies.

3. The management apparatus according to claim 2, wherein the objective information contains a write amount accepted by the replication source volume, and the processor limits the amount of transferred data of the other remote copies based on the write amount and the replication delay time in the objective information.

4. The management apparatus according to claim 1, wherein the replication source volume accepts a write request and stores data and the data stored in the replication source volume is duplicated in the replication destination volume by the remote copy, the objective information contains a write amount accepted by the replication source volume, and the processor limits data write to a replication source volume related to the remote copy based on the write amount and replication delay time in the objective information and thereby improves the replication delay time of the remote copy.

5. The management apparatus according to claim 1, wherein when a plurality of other remote copies become a candidate of the target of the amount of transferred data limit, the other remote copies subjected to transfer limit are determined based on a difference between performance information of the other remote copies and the objective information thereof.

6. The management apparatus according to claim 1, wherein when a remote copy is newly set for the replication source volume with data stored therein, initial copy is performed to duplicate the stored data, and when a plurality of other remote copies become a candidate of the target of the amount of transferred data limit, the processor stops the other remote copies whose operation status is initial copy.

7. The management apparatus according to claim 1, wherein grouping is performed with respect to remote copies for which at least either of a storage apparatus where the replication source volume is disposed and a storage apparatus where the replication destination volume is disposed is common and other remote copies for which an amount of transferred data is limited are selected from the same group as a remote copy related to the replication delay time.

8. The management apparatus according to claim 7, wherein an amount of transferred data of the remote copy is limited so that a plurality of remote copies in an identical group become substantially equal in the degree of attainment of an objective value of the replication delay time.

9. The management apparatus according to claim 1, wherein other remote copies subjected to the transfer limit are selected with a journal usage ratio of a remote copy of journal-based system taken into account.

10. A management method in which a management apparatus including a processor manages a plurality of storage apparatuses communicating with one another via a network and having a respective volume, the method comprising the steps of:

setting a remote copy transferred from a replication source volume of a plurality of the volumes to a replication destination volume via the network and duplicated is set for a combination of a plurality of replication source volumes and replication destination volumes;

setting a plurality of the remote copies from the storage apparatus having a plurality of the replication source volumes to the storage apparatus having a plurality of the replication destination volumes;

setting objective information that is a performance objective of the remote copy and contains an objective value of a replication delay time to each of the plurality of remote copies;

monitoring the replication delay time, which is a time required for the replication of the remote copy; and exercising control to limit an amount of transferred data of other remote copies, which have an influence on one of the remote copies, based on the replication delay time in order to improve the replication delay time of the one of the remote copies so as to satisfy the performance objective.

11. A storage system comprising:

a plurality of storage apparatuses communicating with one another via a network and having a respective volume; and a management apparatus that includes a processor and manages a plurality of the storage apparatuses, wherein a remote copy transferred from a replication source volume of a plurality of the volumes to a replication destination volume via the network and duplicated is set for a combination of a plurality of replication source volumes and replication destination volumes, the remote copy exists in plurality and a plurality of the remote copies are set from the storage apparatus having a plurality of the replication source volumes to the storage apparatus having a plurality of the replication destination volumes, objective information that is a performance objective of the remote copy and contains an objective value of a replication delay time is set to each of the plurality of remote copies, and the processor;

monitors the replication delay time, which is a time required for the replication of the remote copy; and exercises control to limit an amount of transferred data of other remote copies, which have an influence on one of the remote copies, based on the replication delay time in order to improve the replication delay time of the one of the remote copies so as to satisfy the performance objective.

* * * * *